(12) United States Patent
Tamiya et al.

(10) Patent No.: US 7,336,367 B2
(45) Date of Patent: Feb. 26, 2008

(54) LIGHT-RECEIVING/EMITTING COMPOSITE UNIT, METHOD FOR MANUFACTURING THE SAME, AND DISPLACEMENT DETECTION DEVICE

(75) Inventors: Hideaki Tamiya, Kanagawa (JP); Kayoko Taniguchi, Kanagawa (JP); Akihiro Kuroda, Kanagawa (JP); Hidehiro Kume, Tokyo (JP)

(73) Assignee: Sony Manufacturing Systems Corporation, Tokyo (JP)

( * ) Notice: Subject to any disclaimer, the term of this patent is extended or adjusted under 35 U.S.C. 154(b) by 0 days.

(21) Appl. No.: 11/654,815

(22) Filed: Jan. 18, 2007

(65) Prior Publication Data

US 2007/0115479 A1   May 24, 2007

Related U.S. Application Data

(62) Division of application No. 10/414,860, filed on Apr. 15, 2003, now Pat. No. 7,187,449.

(30) Foreign Application Priority Data

Apr. 26, 2002  (JP)  ............................ P2002-127525
Apr. 26, 2002  (JP)  ............................ P2002-127526
Apr. 26, 2002  (JP)  ............................ P2002-127527

(51) Int. Cl.
  *G01B 9/02*  (2006.01)
(52) U.S. Cl. .................................................. 356/494
(58) Field of Classification Search ............... 356/491, 356/492, 494, 499, 521; 250/559.29
See application file for complete search history.

(56) References Cited

U.S. PATENT DOCUMENTS

| 4,757,196 | A | 7/1988 | Yamada et al. ............. 250/231 |
| 5,051,579 | A | 9/1991 | Tsukijii et al. ......... 250/231.16 |
| 5,107,107 | A | 4/1992 | Osborne ................ 250/231.14 |
| 5,949,546 | A | 9/1999 | Lee et al. .................... 356/351 |
| 6,344,898 | B1 | 2/2002 | Gemma et al. ............. 356/513 |
| 6,956,654 | B2 * | 10/2005 | Osaki et al. ................ 356/494 |

FOREIGN PATENT DOCUMENTS

JP          60-98302          6/1985

(Continued)

*Primary Examiner*—Gregory J. Toatley, Jr.
*Assistant Examiner*—Michael A Lyons
(74) *Attorney, Agent, or Firm*—Haverstock & Owens LLP

(57) ABSTRACT

A displacement detection device having excellent stability with the lapse of time and suitable for reduction in size and weight includes: a light source for emitting light; polarizing light splitting unit for splitting the light emitted from the light source into two light beams having difference polarized components, radiating the two light beams to an external optical system, and combining the two light beams reflected by the external optical system to generate combined light; a phase plate provided between the light source and the polarizing light splitting unit and adapted for changing the polarization state of the light emitted from the light source and leading the light to the polarizing light splitting unit; light splitting films for splitting the combined light generated by the polarizing light splitting unit into plural light beams; polarizing units for transmitting only a predetermined polarized components of the split combined light beams; and light-receiving elements for photoelectrically converting coherent light beams transmitted through the polarizing units and thus generating an interference signal.

8 Claims, 22 Drawing Sheets

FOREIGN PATENT DOCUMENTS

| | | |
|---|---|---|
| JP | 61-83911 | 4/1986 |
| JP | 63-277926 | 11/1988 |
| JP | 5-215574 | 8/1993 |
| JP | 2000-81308 | 3/2000 |
| JP | 2005-215574 | 8/2005 |
| WO | 02/063246 A1 | 8/2002 |

* cited by examiner

LIGHT-RECEIVING/EMITTING COMPOSITE UNIT, METHOD FOR MANUFACTURING THE SAME, AND DISPLACEMENT DETECTION DEVICE

This is a divisional of U.S. patent application Ser. No. 10/414,860, filed Apr. 15, 2003, now U.S. Pat. No. 7,187,449 entitled LIGHT-RECEIVING/EMITTING COMPOSITE UNIT, METHOD FOR MANUFACTURiNG THE SAME, AND DISPLACEMENT DETECTION DEVICE, the contents of which are hereby incorporated by reference.

BACKGROUND OF THE INVENTION

1. Field of the Invention

This invention relates to a light-receiving/emitting composite unit, a method for manufacturing the same, and a displacement detection device for detecting a relative shift position of a moving part of a machine tool, a semiconductor manufacturing device or the like.

This application claims priority of Japanese Patent Application Nos. 2002-127525, 2002-127526 and 2002-127527, file on Apr. 26, 2002, the entireties of which are incorporated by reference herein.

2. Description of the Related Art

Conventionally, an optical displacement detection device using a diffraction grating has been known as a device for detecting a relative shift position of a moving part of a machine tool, a semiconductor manufacturing device or the like.

For example, FIGS. 1 and 2 show a conventional optical displacement measuring device proposed in the Japanese Publication of Laid-Open Patent Application No. S60-98302. FIG. 1 is a perspective view schematically showing this conventional optical displacement measuring device 100. FIG. 2 is a side view schematically showing this conventional optical displacement measuring device 100.

The conventional optical displacement measuring device 100 has a diffraction grating 101 which linearly moves in the directions of arrows X1 and X2 in FIGS. 1 and 2 along with the movement of a moving part of a machine tool or the like, a light source 102 for emitting light, a half mirror 103 for splitting the light emitted from the light source 102 into two beams and superposing two diffracted light beams from the diffraction grating 101 to cause interference, two mirrors 104a, 104b for reflecting the diffracted light beams diffracted from the diffraction grating 101, and a photodetector 105 for photoelectrically converting the two diffracted light beams interfering with each other and thus generating an interference signal.

The light emitted from the light source 102 is split into two beams by the half mirror 103. These two beams are cast on the diffraction grating 101. Each of the two beams cast on the diffraction grating 101 is diffracted by the diffraction grating 101 and becomes diffracted light (hereinafter this diffracted light is referred to as first-time diffracted light). This first-time diffracted light is reflected by the mirrors 104a, 104b. The first-time diffracted light reflected by the mirrors 104a, 104b is cast again on the diffraction grating 101 and diffracted again (hereinafter this re-diffracted light referred to as second-time diffracted light). The two second-time diffracted light beams become incident on the half mirror 103 through the same optical path, then superposed to interfere with each other, and cast on the photodetector 105.

In such a conventional optical displacement measuring device 100, displacement of the diffraction grating 101 in the directions of arrows X1 and X2 in FIGS. 1 and 2 can be detected. Specifically, in the optical displacement measuring device 100, a phase difference is generated in the two second-time diffracted light beams from the diffraction grating 101 in accordance with the movement of the diffraction grating 101. Therefore, this optical displacement measuring device 100 can measure the shift position of a moving part of a machine tool or the like by detecting the phase difference between the two second-time diffracted light beams from an interference signal provided from the photodetector.

FIGS. 3 and 4 show another conventional optical displacement measuring device proposed in the Japanese Publication of Laid-Open Patent Application No. H60-98302. FIG. 3 is a perspective view schematically showing a conventional optical displacement measuring device 110. FIG. 4 is a side view schematically showing the conventional optical displacement measuring device 110.

The conventional optical displacement measuring device 110 has a diffraction grating 111 which linearly moves in the directions of arrows X1 and X2 in FIGS. 3 and 4 along with the movement of a moving part of a machine tool or the like, a light source 112 for emitting light, a half mirror 113 for splitting the light emitted from the light source 112 into two beams and superposing two diffracted light beams from the diffraction grating 111 to cause interference, two first mirrors 114a, 114b for casting the two beams split by the half mirror 113 at the same position on the diffraction grating 111, two second mirrors 115a, 115b for reflecting the diffracted light beams diffracted from the diffraction grating 111, and a photodetector 116 for receiving the two diffracted light beams interfering with each other and thus generating an interference signal.

The light emitted from the light source 112 is split into two beams by the half mirror 113. These two beams are reflected by the first mirrors 114a, 114b, respectively, and cast at the same position on the diffraction grating 111. Each of the two beams cast on the diffraction grating 111 is diffracted by the diffraction grating 111 and becomes first-time diffracted light. This first-time diffracted light is reflected by the second mirrors 115a, 115b. The first-time diffracted light is cast again on the diffraction grating 111 and diffracted to become second-time diffracted light. The two second-time diffracted light beams become incident on the half mirror 113 through the same optical path, then superposed to interfere with each other, and cast on the photodetector 116.

In such a conventional optical displacement measuring device 110, displacement of the diffraction grating 111 in the directions of arrows X1 and X2 in FIGS. 3 and 4 can be detected. Specifically, in the optical displacement measuring device 110, a phase difference is generated in the two second-time diffracted light beams from the diffraction grating 111 in accordance with the movement of the diffraction grating 111. Therefore, this optical displacement measuring device 110 can measure the shift position of a moving part of a machine tool or the like by detecting the phase difference between the two second-time diffracted light beams from an interference signal provided from the photodetector 116.

However, in the manufacturing process, it is necessary to assemble the above-described conventional optical displacement measuring devices 100 and 110 while adjusting the separately manufactured individual optical components. Therefore, precise adjustment is required with respect to unevenness in accuracy of completion and characteristics of each component, and the process is complicated. Moreover, the device lacks stability with the lapse of time and reduction in size and weight of the whole device is obstructed.

The polarization axis of the light emitted from the light source must be adjusted to an angle at which the light is distributed at a ratio of one to one by the half mirrors 103, 113. Therefore, a more complicated process must be introduced and an excessive space is necessary in the device.

Moreover, in the manufacturing process, it is necessary to assemble the above-described conventional optical displacement measuring devices 100 and 110 while adjusting the separately manufactured individual optical components. Therefore, precise adjustment is required with respect to unevenness in accuracy of completion and characteristics of each component. A complicated process must be introduced, thus obstructing reduction in price.

As a large space is necessary for adjusting, fastening and fixing the components, miniaturization of the whole device cannot be realized.

Furthermore, since an adhesive must be used for fixing the components, the adhesive state changes depending on the environmental changes, and a deviation between the components may occur because of the environmental changes and changes with the lapse of time.

Meanwhile, when a difference occurs in the optical path lengths of the two beams split by the above-described half mirror 113, a phase change occurs, causing a measurement error. Therefore, in the optical displacement measuring device 100 and 110, the optical path lengths of the above-described two split beams must be adjusted to be equal in order to realize desired characteristics.

FIG. 5 shows a conventional optical displacement measuring device in which the optical path length of the split beams can be adjusted to be equal, proposed in the Japanese Publication of Laid-Open Patent Application No. S61-83911.

This conventional optical displacement measuring device 120 has a diffraction grating 121 which linearly moves in the directions of arrows X1 and X2 in FIG. 5 along with the movement of a moving part of a machine tool or the like, a light source 122 made of a multi-mode semiconductor laser for emitting light, a half mirror 123 for splitting the light emitted from the light source 122 into two beams and superposing two diffracted light beams from the diffraction grating 121 to cause interference, two mirrors 124a, 124b for reflecting the diffracted light beams diffracted from the diffraction grating 121, a half mirror 125 for separating the diffracted light beams interfering with each other, and photodetectors 126a, 126b for photoelectrically converting these diffracted light beams to generate an interference signal.

The light emitted from the light source 122 is split into two beams by the half mirror 123. These two beams are cast on the diffraction grating 121. Each of the two beams cast on the diffraction grating 121 is diffracted by the diffraction grating 121 and becomes first-time diffracted light. The first-time diffracted light is reflected by the mirrors 124a, 124b. The first-time diffracted light is cast again on the diffraction grating 121 and diffracted to become second-time diffracted light. The two second-time diffracted light beams become incident on the half mirror 123 through the same optical path, then superposed to interfere with each other, and cast on the photodetectors 126a, 126b via the half mirror 125.

In such a conventional optical displacement measuring device 120, since a multi-mode semiconductor laser is used as the light source, displacement of the diffraction grating 121 in the directions of arrows X1 and X2 in FIG. 5 can be detected while the optical path lengths of the split beams can be controlled. That is, in this optical displacement measuring device 120, since the difference in optical path length can be detected, precise adjustment of the optical path length can be realized. Moreover, since the adjustment state can be monitored, an error based on a change in wavelength can be easily identified.

Meanwhile, in the above-described optical displacement measuring devices 100 and 110, position detection is difficult when rotational shift in the directions of arrows A1 and A2 and rotational shift in the directions of arrows B1 and B2 occur, as shown in FIGS. 1 to 4. To prevent the influence of such changes in angle of the diffraction grating, another optical displacement measuring device is proposed, for example, in the Japanese Publication of Laid-Open Patent Application No. 2000-81308.

This conventional optical displacement measuring device 130 has a diffracting grating 131 which is mounted on a moving part of a machine tool or the like and linearly moves, a light source 132 for emitting light, a light-receiving element 133 for receiving two second-time diffracted light beams Lc1, Lc2 interfering with each other and thus generating an interference signal, a position detecting unit 134 for detecting a shift position from the diffraction grating 131 on the basis of the interference signal from the light-receiving element 133, an irradiation light-receiving optical system 135 for splitting light La emitted from the light source 132 into two beams La1, La2 and casting the two beams on the diffraction grating 131 and for causing the second-time diffracted light beams Lc1, Lc2 from the diffraction grating 131 to interfere with each other and casting these second-time diffracted light beams on the light-receiving element 133, and a reflection optical system 136 for reflecting two first-time diffracted light beams Lb1, Lb2 from the diffraction grating 131 and casting these first-time diffracted light beams again on the diffraction grating 131, as shown in FIG. 6.

The irradiation light-receiving optical system 135 has a first image-forming element 141 for causing image formation of the light La emitted from the light source 132 onto the lattice plane of the diffraction grating 131, a half mirror 142 for splitting the light La emitted from the light source into the two beams La1, La2 and superposing the two second-time diffracted light beams Lc1, Lc2 from the diffraction grating 131 to cause interference, a reflector 143 for reflecting the light beams La1, La2 split by the half mirror 142 and reflecting the second-time diffracted light beams Lc1, Lc2, and a second image-forming element 144 for causing image formation of the two second diffracted light beams Lc1, Lc2 superposed by the half mirror 142 onto the light-receiving surface of the light-receiving element 133.

The reflection optical system 136 has reflectors 146 for reflecting the first-time diffracted light beams Lb1, Lb2 generated from the light beams La1, La2 and casting the first-time diffracted light beams again on the diffraction grating 131, and third image-forming elements 148 for collimating the first-time diffracted light beams Lb1, Lb2 generated from the light beams La1, La2 and casting the collimated light beams on the reflectors 146.

In the optical displacement measuring device 130 of the above-described structure, as the diffraction grating 131 shifts in a direction X1 or X2 in accordance with the movement of the moving part, a phase difference is generated between the two second-time diffracted light beams Lc1, Lc2. In this optical displacement measuring device 130, the two second-time diffracted light beams Lc1, Lc2 are caused to interfere with each other and an interference signal is detected. The phase difference between the two second-time diffracted light beams Lc1, Lc2 is found from the interference signal and the shift position of the diffraction grating 131 is detected.

Moreover, in this optical displacement measuring device 130, the first image-forming element 141 causes image formation of the light La emitted from the light source 132 on the lattice plane of the diffraction grating 131 and the third image-forming elements 148 collimate the first-time diffracted light beams Lb1, Lb2 and constantly cast the collimated light beams perpendicularly to the reflectors 146. Therefore, the first-time diffracted light beams Lb1, Lb2 reflected by the reflectors 146 necessarily return on the same optical paths as in the case of incidence and become incident on the same point of incidence on the lattice plane of the diffraction grating 131, even when their optical axes are deviated from each other. Therefore, in this optical displacement measuring device 130, even when the diffraction grating 130 is inclined, the second-time diffracted light beams Lc1, Lc2 necessarily pass the same optical paths as in the case of incidence. There is no change in their optical path lengths.

However, the optical displacement measuring device 120 using a multi-mode semiconductor laser as the light source, proposed in the Japanese Publication of Laid-Open Patent Application No. S61-83911, has a problem that a general semiconductor laser cannot be used, though the device can control the optical path length with respect to changes in wavelength of the light source and thus can realize stable characteristics. Moreover, the optical displacement measuring device 120 cannot deal with changes in angle of the diffraction grating and has a problem that allowable errors are limited not only at the time of actually mounting the components constituting the device but also at the time of mounting the diffraction grating on the moving part.

In the optical displacement measuring device 130 proposed in the Japanese Publication of Laid-Open Patent Application No. 2000-81308, which reduces the influence of changes in angle of the diffraction grating, an image-forming element such as a lens must be used for realizing angle adjustment of the optical path and the structure of the device is complicated. Moreover, since this optical displacement measuring device 130 uses individual components such as lenses and half mirrors, the device lacks stability with the lapse of time and miniaturization of the device is seriously obstructed.

SUMMARY OF THE INVENTION

In view of the foregoing status of the art, it is an object of the present invention to provide a light-receiving/emitting composite unit, a method for manufacturing the same, and a displacement detection device which realize excellent stability with the lapse of time and are suitable for reduction in size and weight.

In order to solve the above-described problems, a light-receiving/emitting composite unit according to the present invention includes: a light source for emitting light; a polarizing beam splitter for splitting the light emitted from the light source into two light beams having different polarized components, then radiating the two light beams to an external optical system, and combining the two light beams reflected from the external optical system to generate combined light; a phase plate arranged between the light source and the polarizing beam splitter and adapted for changing the polarization state of the light emitted from the light source and leading the light to the polarizing beam splitter; light splitting means for splitting the combined light generated by the polarizing beam splitter into plural light beams; polarization means for transmitting only a predetermined polarized component of the split combined light; and light-receiving means for photoelectrically converting coherent light transmitted through the polarization means and thus generating an interference signal.

In order to solve the above-described problems, a method for manufacturing a light-receiving/emitting composite unit according to the present invention is adapted for manufacturing a light-receiving/emitting composite unit in which light emitted from a light-emitting element and having a polarization state by a phase plate is split into two light beams and radiated to an external optical system, the emitted light beams reflected from the external optical system are combined with each other, and the polarization state of the combined light is changed by the phase plate and detected via a light-receiving element, the method including: a step of sequentially stacking a light splitting layer for splitting the combined light into plural light beams, the phase plate and a polarizing plate for transmitting only a predetermined polarized component, thus forming a multilayer board; a cut-out step of cutting out the formed multilayer board by the light-receiving/emitting unit; and a joining step of joining a composite lens unit for leading the light transmitted through the polarizing plates to the light-receiving element, to the cut-out multilayer board, and joining a light-emitting/receiving unit including the light-receiving element and the light-emitting element to the joined composite lens unit.

In order to solve the above-described problems, a displacement detection device according to the present invention is adapted for detecting displacement of an inspection target having a reflection-type diffraction grating in the direction of a lattice vector, on the basis of an interference signal, the device including: a light source for emitting light; a polarizing beam splitter for splitting the light emitted from the light source into two light beams having difference polarized components and radiating the two light beams; a phase plate arranged between the light source and the polarizing beam splitter and adapted for changing the polarization state of the light emitted from the light source and leading the light to the polarizing beam splitter; image formation means for causing image formation of the two light beams radiated from the beam splitter onto a lattice plate of the diffraction grating; reflection means for reflecting two first diffracted light beams obtained as the two light beams radiated from the beam splitter are diffracted by the diffraction grating; light splitting means for combining two second diffracted light beams obtained as the first diffracted light beams reflected by the reflection means are diffracted by the diffraction grating, to generate combined light, and then splitting the combined light into plural light beams; polarization means for transmitting only a predetermined polarized component of the split combined light; and light-receiving means for photoelectrically converting coherent light transmitted through the polarization means and thus generating the interference signal.

In view of the foregoing status of the art, it is another object of the present invention to provide a light-receiving/emitting composite unit and a displacement detection device that are available at a low price, suitable for reduction in size and weight, and highly reliable.

Specifically, in order to solve the above-described problems, a light-receiving/emitting composite unit according to the present invention includes: a light source for emitting light; a polarizing beam splitter for splitting the light emitted from the light source into two light beams having different polarized components, then radiating the two light beams to an external optical system, and combining the two light beams reflected from the external optical system to generate combined light; light splitting means for splitting the combined light generated by the polarizing beam splitter into plural light beams; polarization means for transmitting only a predetermined polarized component of the split combined light; a lens unit for leading plural coherent light beams transmitted through the polarization means to predetermined positions, respectively; and light-receiving means for photoelectrically converting the plural coherent light beams led by the lens unit and thus generating an interference signal.

In order to solve the above-described problems, a displacement detection device according to the present invention is adapted for detecting displacement of an inspection target having a reflection-type diffraction grating in the direction of a lattice vector, on the basis of an interference signal, the device including: a light source for emitting light; a polarizing beam splitter for splitting the light emitted from the light source into two light beams having difference polarized components and radiating the two light beams; reflection means for reflecting two first diffracted light beams obtained as the two light beams radiated from the beam splitter are diffracted by the diffraction grating; light splitting means for combining two second diffracted light beams obtained as the first diffracted light beams reflected by the reflection means are diffracted by the diffraction grating, to generate combined light, and then splitting the combined light into plural light beams; polarization means for transmitting only a predetermined polarized component of the split combined light; a lens unit for leading plural coherent light beams transmitted through the polarization means to predetermined positions, respectively; and light-receiving means for photoelectrically converting the plural coherent light beams led by the lens unit and thus generating the interference signal.

In view of the foregoing status of the art, it is still another object of the present invention to provide a displacement detection device that can use any type of light source, can deal with changes in angle of a diffraction grating, realizes miniaturization of the device, and has excellent stability with the lapse of time.

In order to solve the above-described problems, a displacement detection device according to the present invention is adapted for detecting displacement of an inspection target having a reflection-type diffraction grating in the direction of a lattice vector, on the basis of an interference signal, the device including: a light source for emitting light; a beam splitter for splitting the light emitted from the light source into two light beams and radiating the two light beams; a first lens provided between the light source and the beam splitter; reflection means for reflecting two first diffracted light beams obtained as the two light beams radiated from the beam splitter are diffracted by the diffraction grating; light splitting means for combining two second diffracted light beams obtained as the first diffracted light beams reflected by the reflection means are diffracted by the diffraction grating, to generate combined light, and then splitting the combined light into plural light beams; polarization means for transmitting only a predetermined polarized component of the split combined light; light-receiving means for photoelectrically converting coherent light transmitted through the polarization means and thus generating the interference signal; and a second lens provided between the polarization means and the light-receiving means.

DESCRIPTION OF THE PREFERRED EMBODIMENTS

First, a displacement detection device according to a first embodiment of the present invention will be described.

Figure 1:
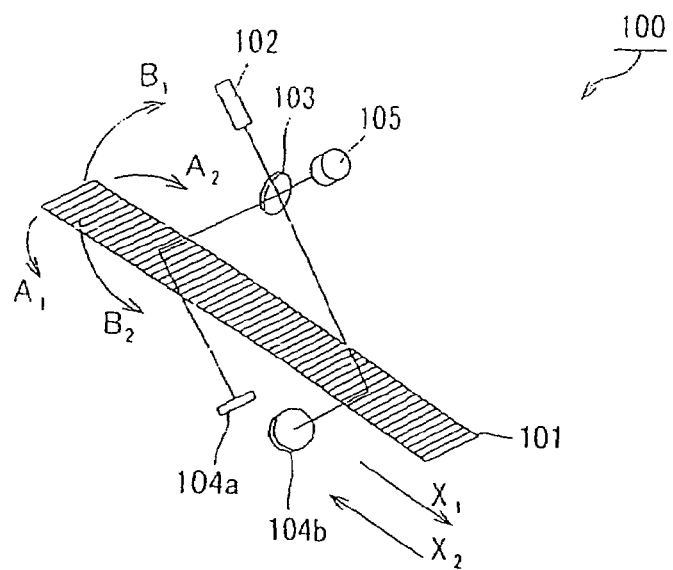
FIG. 1 is a perspective view showing a conventional optical displacement measuring device.
Figure 2:
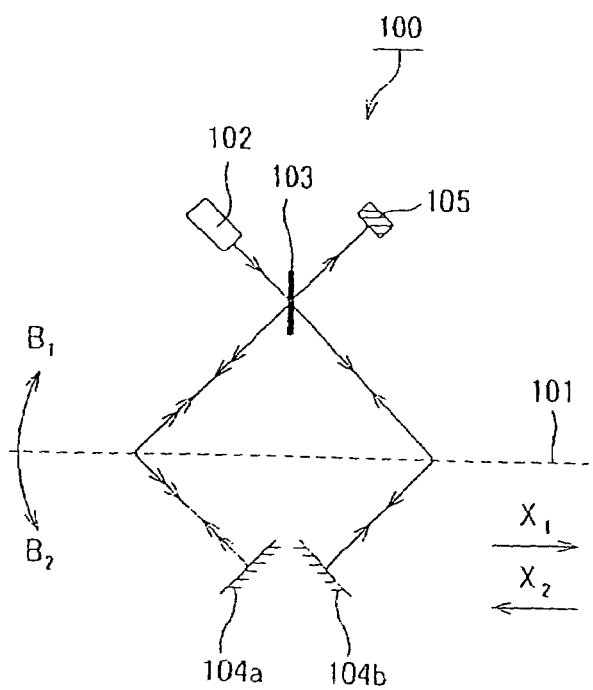
FIG. 2 is a side view showing the conventional optical displacement measuring device.
Figure 3:
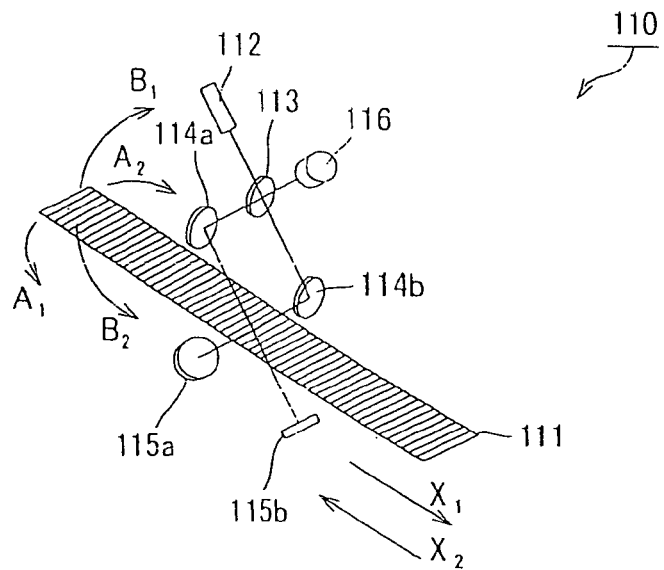
FIG. 3 is a perspective view showing another conventional optical displacement measuring device.
Figure 4:
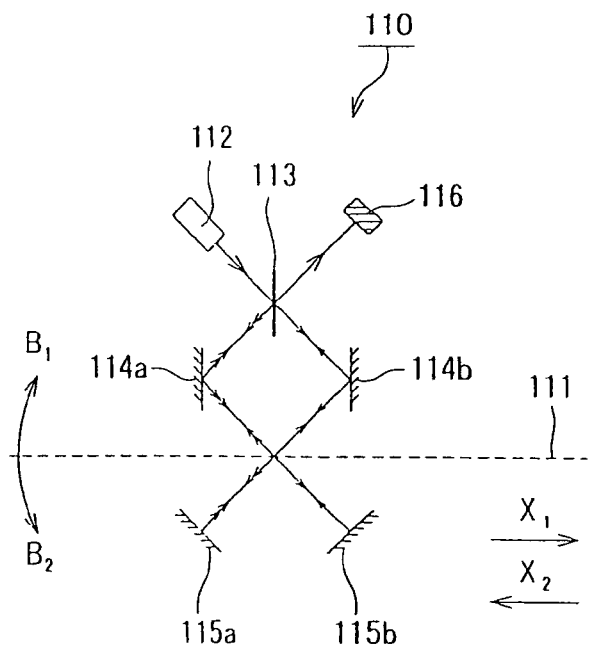
FIG. 4 is a side view showing this another conventional optical displacement measuring device.
Figure 5:
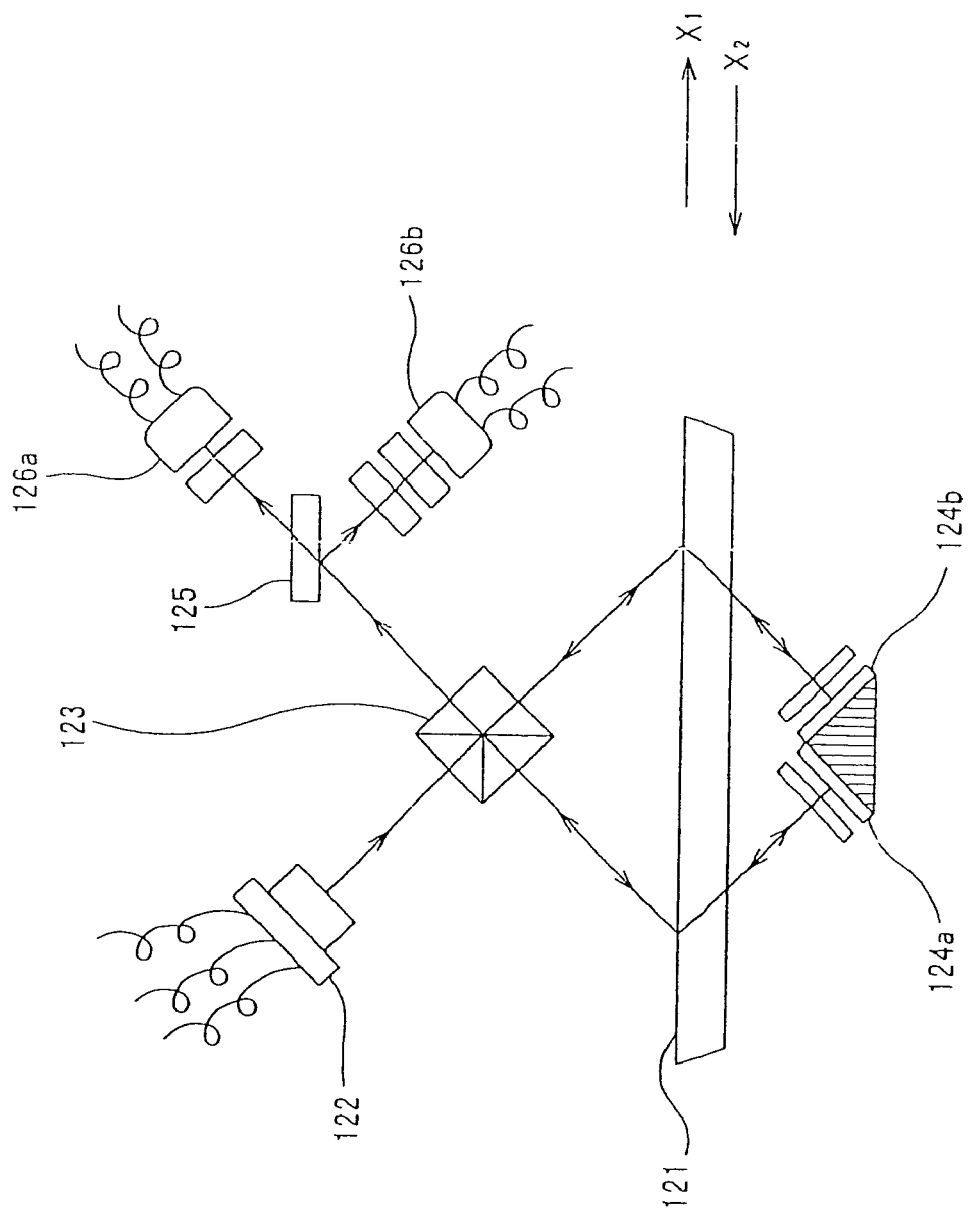
FIG. 5 is a view for explaining still another conventional optical displacement measuring device.
Figure 6:
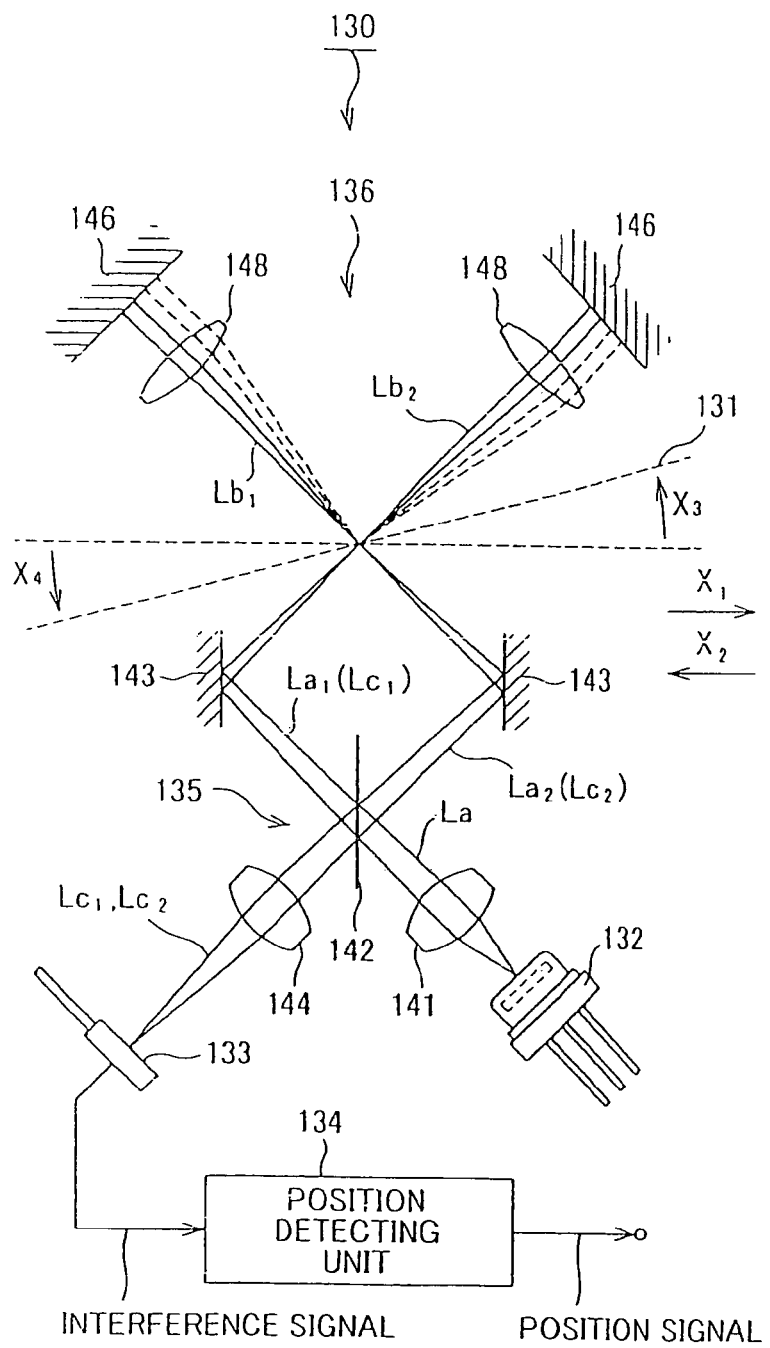
FIG. 6 is a view for explaining an optical displacement measuring device capable of preventing influence of a change in angle of a diffraction grating.
Figure 7:
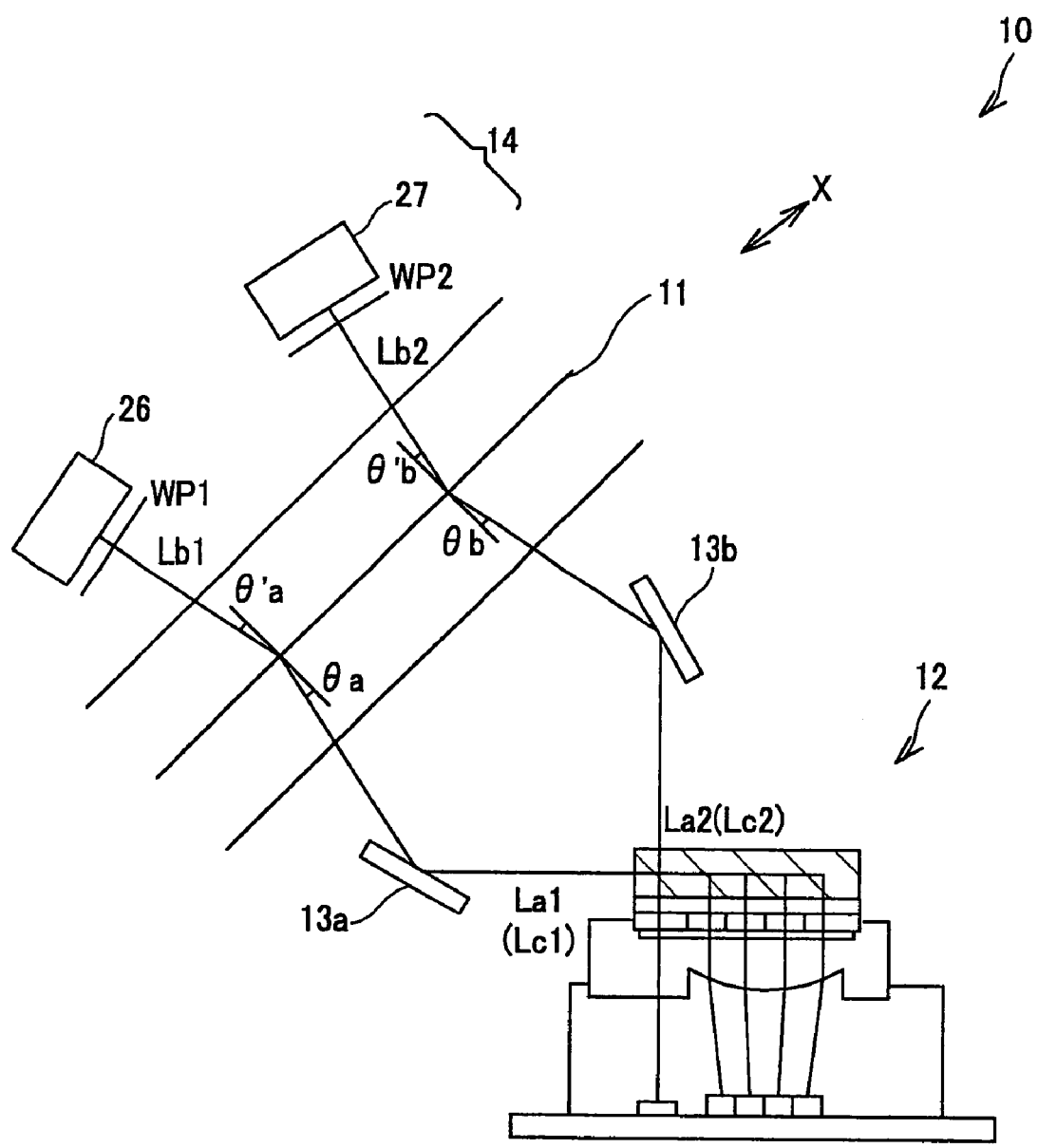
FIG. 7 is a view for explaining the structure of a displacement detection device according to the present invention.

A displacement detection device 10 according to the first embodiment of the present invention has a transmission-type diffraction grating 11 which is mounted on a moving part of a machine tool or the like and linearly moves, a light-receiving/emitting composite unit 12 for splitting light emitted from a light-emitting element into two light beams La1, La2 and radiating the two light beams and for causing two second-time diffracted light beams Lc1, Lc2 diffracted by the diffraction grating 11 to interfere with each other and thus detecting an interference signal, reflecting members 13a, 13b for casting the two light beams La1, La2 radiated from the light-receiving/emitting composite unit 12 onto the diffraction grating 11 and leading the two second-time diffracted light beams Lc1, Lc2 from the diffraction grating 11 to the light-receiving/emitting composite unit 12, and a reflection optical system 14 for reflecting two first-time diffracted light beams Lb1, Lb2 from the diffraction grating 11 and casting the first-time diffracted light beams again on the diffraction grating 11, as shown in FIG. 7.

Figure 8:
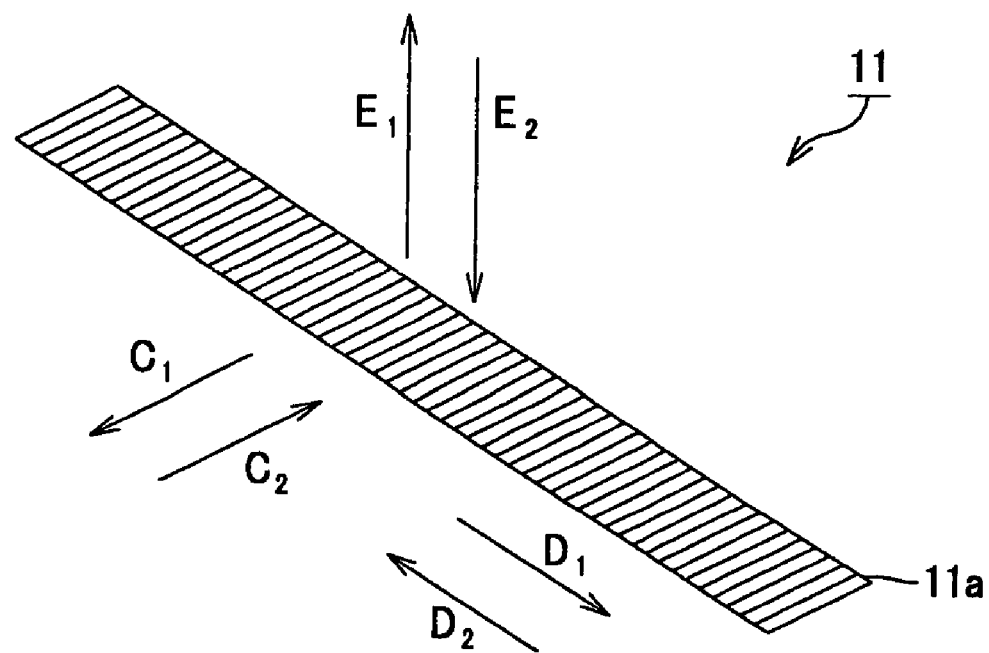
FIG. 8 is a perspective view showing a diffraction grating used for detecting displacement.

The diffraction grating 11 has, for example, a thin plate-like shape and has narrow slits or grooves, or lattices with distributed refractive index, engraved at predetermined intervals on its surface, as shown in FIG. 8. Light incident on such a diffraction grating 11 is diffracted by the slits or the like engraved on the surface and transmitted through the diffraction grating 11. The diffracted light due to the diffraction is generated in a direction defined by the interval of the lattice and the wavelength of the light.

In the description of the embodiments of the present invention, the surface of the diffraction grating 11 on which the lattice is formed is referred to as lattice plane 11a. If the diffraction grating 11 is of transmission type, both the surface on which light is incident and the surface on which diffracted light is generated are referred to as lattice planes 11a. The directions in which the lattice of the diffraction grating 11 is formed (directions of arrows C1 and C2 in FIG. 8), that is, the directions perpendicular to a lattice vector representing the direction of a change in transmittance and reflectance of the lattice or a change in depth of the grooves or the like and parallel to the lattice plane 11a, are referred to as lattice directions. The directions perpendicular to the direction in which the lattice is formed and parallel to the lattice plane 11a (directions of arrows D1 and D2 in FIG. 8), that is, the directions parallel to the lattice vector of the diffraction grating 11, are referred to as lattice vector directions. These directions on the diffraction grating 11 are similarly referred to not only in the first embodiment of the present invention but also in the other embodiments.

The diffraction grating 11 is mounted on a moving part of a machine tool or the like and shifts in the directions of arrows D1 and D2 in FIG. 8, that is, in the lattice vector directions, along with the movement of the moving part.

In the present invention, the type of the diffraction grating is not limited. Not only a diffraction grating having a mechanically formed grooves or the like as described above but also a diffraction grating prepared by, for example, printing interference fringes on a photosensitive resin, may be used.

The reflecting member 13a reflects the light La1 and casts the light La1 at a predetermined position on the lattice plane 11a of the diffraction grating 11. As this light La1 is diffracted by the diffraction grating 11, the first-time diffracted light Lb1 is provided. The reflecting member 13b reflects the light La2 and casts the light La2 at a predetermined position on the lattice plane 11a of the diffraction grating 11. As this light La2 is diffracted by the diffraction grating 11, the first-time diffracted light Lb2 is provided.

The second-time diffracted light Lc1, generated as the first-time diffracted light Lb1 is diffracted by the diffraction grating 11, is cast on the reflecting member 13a. The reflecting member 13a reflects this second-time diffracted light Lc1 and casts the second-time diffracted light Lc1 on the light-receiving/emitting composite unit 12. The second-time diffracted light Lc2, generated as the first-time diffracted light Lb2 is diffracted by the diffraction grating 11, is cast on the reflecting member 13b. The reflecting member 13b reflects this second-time diffracted light Lc2 and casts the second-time: diffracted light Lc2 on the light-receiving/emitting composite unit 12.

The predetermined position at which the light is cast by the reflecting member 13a on the lattice plane 11a of the diffraction grating 11 and the predetermined position at which the light is cast by the reflecting member 13b on the lattice plane 11a of the diffraction grating 11 may be close to each other. This can reduce the difference in optical path length caused by the evenness in thickness or the like within the diffraction grating 11 and thus can reduce errors due to the unevenness in thickness or the like of the scale.

The reflection optical system 14 has a reflector 26 for reflecting the first-time diffracted light Lb1 and casting the first-time diffracted light Lb1 again on the diffraction grating 11, a reflector 27 for reflecting the first-time diffracted light Lb2 and casting the first-time diffracted light Lb2 again on the diffraction grating 11, a ¼ wave plate WP1 for changing the polarization state of the first-time diffracted light Lb1, and a ¼ wave plate WP2 for changing the polarization state of the first-time diffracted light Lb2.

The first-time diffracted light Lb1 which has passed through the ¼ wave plate WP1 is cast on the reflector 26. The reflector 26 perpendicularly reflects the first-time diffracted light Lb1 so that this first-time diffracted light Lb1 returns on the same path as the path of incidence. Since the first-time diffracted light Lb1 cast on the reflector 26 has already passed through the ¼ wave plate WP1 and the first-time diffracted light Lb1 reflected by this reflector 26 passes through the ¼ wave plate WP1 again, the first-time diffracted light Lb1 is cast again on the diffraction grating 11 with its direction of polarization rotated 90 degrees.

The first-time diffracted light Lb2 which has passed through the ¼ wave plate WP2 is cast on the reflector 27. The reflector 27 perpendicularly reflects the first-time diffracted light Lb2 so that this first-time diffracted light Lb2 returns on the same path as the path of incidence. Since the first-time diffracted light Lb2 cast on the reflector 27 has already passed through the ¼ wave plate WP2 and the first-time diffracted light Lb2 reflected by this reflector 27 passes through the ¼ wave plate WP2 again, the first-time diffracted light Lb2 is cast again on the diffraction grating 11 with its direction of polarization rotated 90 degrees.

Figure 9:
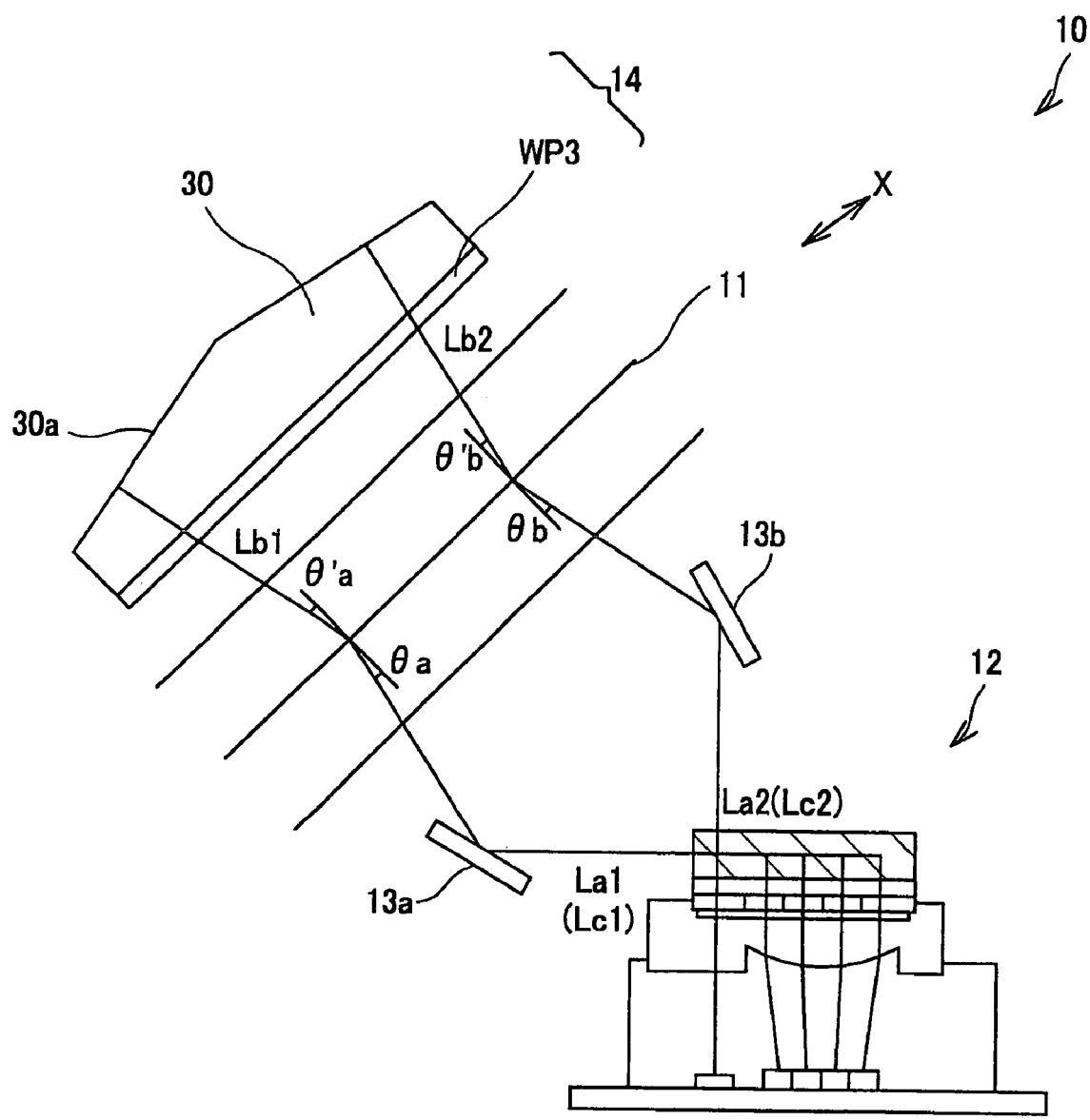
FIG. 9 is a view for explaining the case of using a reflection prism for a reflection optical system.

The reflection optical system 14 is not limited to the above-described structure. For example, a reflection prism may be used. FIG. 9 shows the structure of the displacement detection device 10 using a reflection prism for the reflection optical system 14. In FIG. 9, the same constituent elements and members as those in FIG. 7 are not described.

A ¼ wave plate WP31 is sequentially stacked on a reflection prism 30. The first-time diffracted light beams Lb1, Lb2 which have passed through the ¼ wave plate WP31 are cast on a reflection surface 30a of this reflection prism 30. The reflection surface 30a perpendicularly reflects the first-time diffracted light beams Lb1, Lb2 so that these first-time diffracted light beams Lb1, Lb2 return on the same paths as their paths of incidence. Since the first-time diffracted light beams Lb1, Lb2 cast on this reflection surface 30a have already passed through the ¼ wave plate WP31 and the first-time diffracted light beams Lb1, Lb2 reflected by the reflection surface 30a pass the ¼ wave plate WP31 again, these first-time diffracted light beams Lb1, Lb2 are cast again on the diffraction grating 11 with their direction of polarization rotated 90 degrees.

Figure 10:
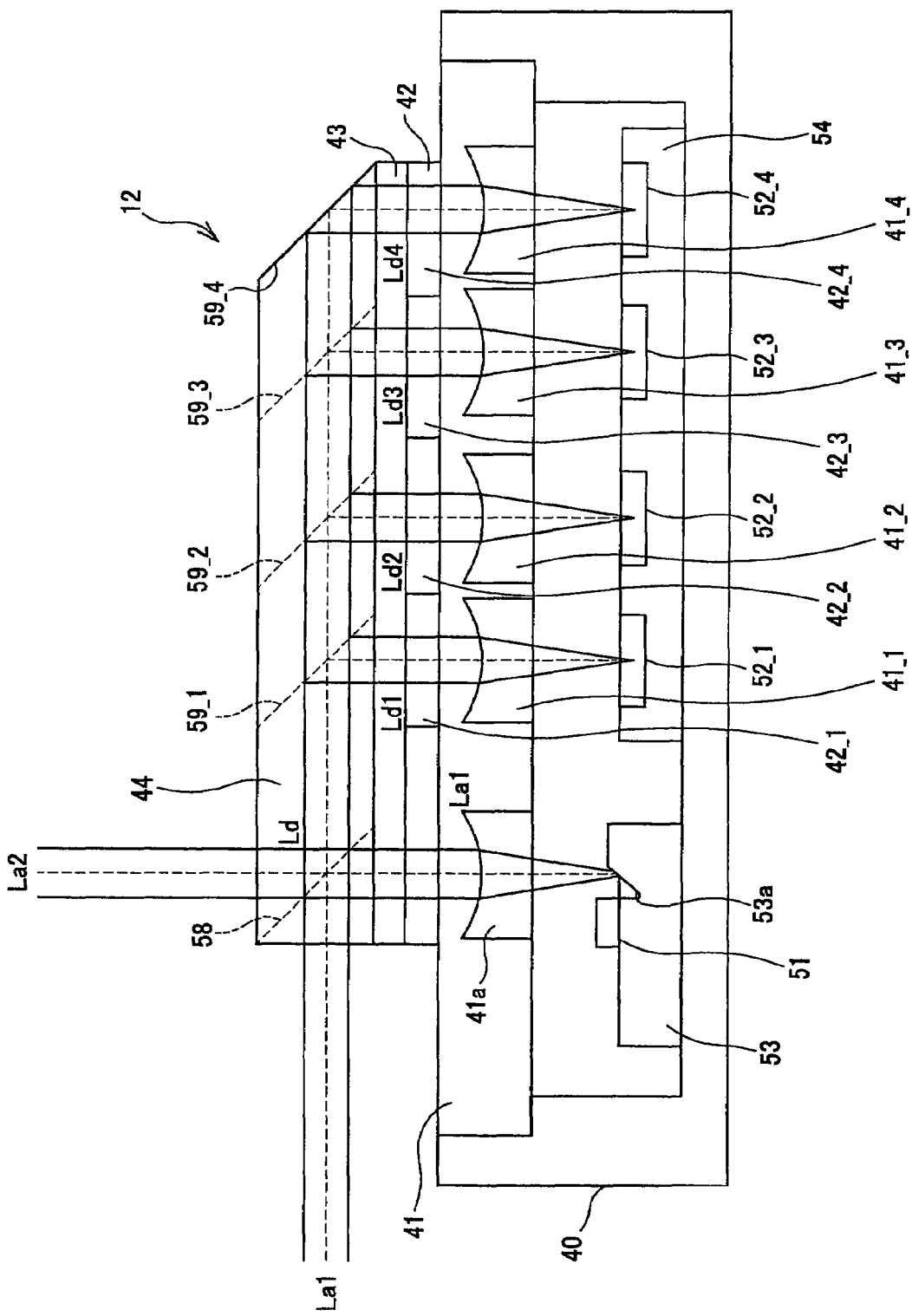
FIG. 10 is a structural view of a light-receiving/emitting composite unit.

The light-receiving/emitting composite unit 12 will now be described in detail. The light-receiving/emitting composite unit 12 has a housing member 40 for housing a light-emitting element and a light-receiving element, a composite lens unit 41 including plural lenses (41a, 41_1, 41_2, 41_3, and 41_4), polarizing units 42 (42_1, 42_2, 42_3, and 42_4) for transmitting only a predetermined polarized component, a phase plate 43 for changing the polarization state of light, and a light splitting unit 44 for splitting the light cast on the diffraction grating 11 or splitting the second-time diffracted light beams Lc1, Lc2 obtained through diffraction by the diffraction grating 11, as shown in FIG. 10.

The housing member 40 has a light source 51 for radiating light La, a light-receiving element 52 (52_1, 52_2, 52_3, and 52_4) for photoelectrically converting coherent light, which will be described later, and thus generating an interference signal, a semiconductor substrate 53 for installing the light source 51 thereon and performing optical path control by applying an electric signal thereto or using a reflection surface 53a, and a semiconductor substrate 54 for installing the light-receiving element thereon and taking out an electric signal.

The light splitting unit 44 has a polarizing light splitting unit 58 for splitting the light La radiated from the light source 51 into two light beams La1, La2 and radiating the two light beams La1, La2 and for combining two second-time diffracted light beams Lc1, Lc2 from the reflecting members 13a, 13b to generate combined light Ld, and light splitting films 59_1, 59_2, 59_3 and 59_4 for splitting the combined light Ld cast from the polarizing light splitting unit 58 into combined light beams Ld1, Ld2, Ld3 and Ld4.

The light source 51 is an element for emitting coherent light such as a laser beam. This light source 51 may be, for example, a multi-mode semiconductor laser for emitting a laser beam having a small coherence length.

The light-emitting element 52 is a photoelectric conversion element for converting light cast on its light-receiving surface into an electric signal corresponding to the quantity of light. For example, the light-emitting element 52 is made of a photodetector or the like. This light-receiving element 52 receives the coherent light beams Ld1, Ld2, Ld3 and Ld4 cast on its light-receiving surface and generates an interference signal corresponding to the quantity of light.

The interference signal generated by photoelectric conversion at the light-receiving element 52 is detected by a position detecting unit, not shown, via the semiconductor substrate 54. This position detecting unit, not shown, finds a phase difference based on the resultant interference signal and outputs a position signal indicating the relative shift position of the diffraction grating 11.

The composite lens unit 41 includes optical elements such as lenses having a predetermined numerical aperture. The light La radiated from the light source 51 is cast on the lens 41a. The lens 41a can perform image formation of the incident light La with a predetermined beam diameter on the lattice plane 11a of the diffraction grating 11 or on the reflectors 26, 27. In this first embodiment, since the transmission-type diffraction grating 11 is used, image formation of the radiated light La is normally done on the reflectors 26, 27. Therefore, the diameter of the beam cast on the lattice plane 11a can be increased and the influence of dust and scratches on the lattice plane 11a can be reduced. As the composite lens unit 41 for controlling the beam diameter of the light radiated to outside and of the received light is arranged in a single package, it is possible to increase the degree of integration, simplify the preparation process, and increase the reliability of the whole device.

The coherent light beams Ld1, Ld2, Ld3 and Ld4 radiated from the polarizing units 42 become incident on the lenses 41_1, 41_2, 41_3 and 41_4, respectively. The lenses 41_1, 41_2, 41_3 and 41_4 perform image formation of the incident coherent light beams Ld1, Ld2, Ld3 and Ld4 on the light-receiving elements 52_1, 52_2, 52_3 and 52_4, respectively. The image forming point need not necessarily be a point where the beam diameter is at its minimum. This composite lens unit 41 is not limited to the structure in which plural lenses are sequentially connected, as described above. For example, the above-described lenses 41_1, 41_2, 41_3 and 41_4 may be collectively constructed as a single lens. Each lens constituting this composite lens unit 41 may not only converge a beam but also radiate collimated light or divergent light.

The polarizing units 42_1, 42_2, 42_3 and 42_4 transmit only predetermined polarized components of the combined light beams Ld1, Ld2, Ld3 and Ld4 made incident from the phase plate 43, and radiate the polarized components to the lens unit 41 as coherent light beams Ld1, Ld2, Ld3 and Ld4. It suffices that the polarizing units 42 are arranged at a 45-degree spacing from each other (for example, at angles of 5, 50, 95 and 140 degrees, respectively). The polarizing units 42 can be arranged without being limited in position at the time of mounting. As such polarizing units 42 are provided between the phase plate 43 and the composite lens unit 41, the structure of the whole unit can be made compact.

Figure 11:
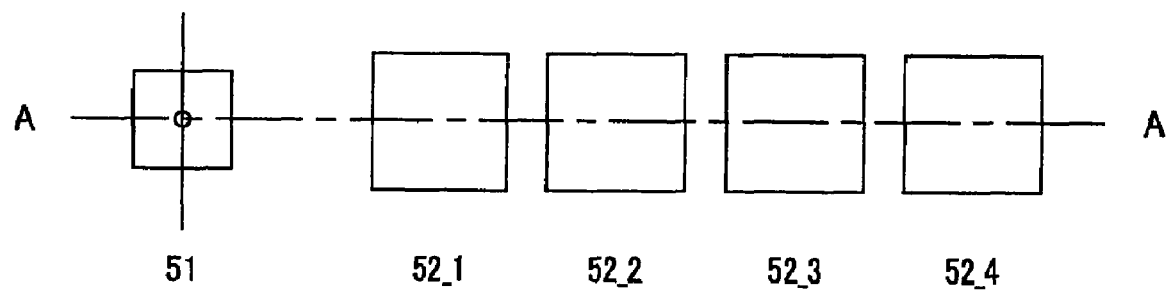
FIG. 11 is a view for explaining the direction of polarization of a light source.

The phase plate 43 is stacked in such a manner that it is inserted between the polarizing units 42 and the light splitting unit 44. This phase plate 43 is made of, for example, ¼ wave plate, and performs conversion between circularly polarized light and linearly polarized light. This phase plate 43 may be made of a film-like ¼ wave plate inclined 45 degrees with respect to a line AA shown in FIG. 11, and in this case, the light La from the light source 51 becomes incident thereon via the lens 41a. The phase plate 43 converts the light La, which is, for example, linearly polarized light, to circularly polarized light, and casts the resultant light on the polarizing light splitting unit 58. Moreover, the phase plate 43 receives the combined light beams Ld1, Ld2, Ld3 and Ld4 radiated from the light splitting unit 44 to circularly polarized light and radiates the resultant light to the above-described polarizing units 42. That is, both the conversion of the polarization state of the light La from the light source 51 and the conversion of the polarization state of the light Ld from the light splitting films 59 are performed by the single phase plate 43. The light-receiving/emitting composite unit 12 may also employ a structure without having this phase plate 43.

The polarizing light splitting unit 58 is made of, for example, a polarizing beam splitter. The light La radiated from the light source 51 becomes incident thereon via the phase plate 43. The polarizing light splitting unit 58 reflects a part of the incident light La to generate light La1 and transmits a part of the incident light La to generate light La2. The polarizing light splitting unit 58 may split the light La into S-polarized light and P-polarized light with orthogonal polarized components, as the light La1 and the light La2. In this case, the light La1 is S-polarized light and the light La2 is P-polarized light. Moreover, the second-time diffracted light Lc1 and the second-time diffracted light Lc2 from the diffraction grating 11 become incident on the polarizing light splitting unit 58. The polarizing light splitting unit 58 superpose the two second-time diffracted light beams Lc1, Lc2 to combine these light beams and radiates the combined light Ld to the light splitting films 59.

The reflectance of the light splitting films 59_1, 59_2, 59_3 and 59_4 is set at ¼, ⅓, ½ and 1, respectively. (That is, the light splitting films 59_4 has a total reflection surface.) Therefore, the incident combined light Ld can be split into combined light beams Ld1, Ld2, Ld3 and Ld4 with substantially the same quantity of light.

The light-receiving/emitting composite unit 12 is constituted as an independent unit, with the above-described housing member 40, composite lens unit 41, polarizing units 42, phase plate 43 and light splitting unit 44 provided in the same package. These members are stacked on each other to form an integrated unit.

That is, as the light-receiving/emitting composite unit 12 has the integrated structure by packaging the respective members, precise position adjustment is easier. Moreover, since the installation space for the components need not be large, reduction in size and weight of the displacement detection device as a whole can be realized. As the members are housed in the same housing unit, the influence of environmental changes and changes with the lapse of time can be reduced, and deviation and the like at the time of adjustment can be restrained to the minimum level. Thus, the reliability of the whole light-receiving/emitting composite unit 12 can be increased.

An exemplary operation of the displacement detection device 10 according to the first embodiment of the present invention will now be described.

First, the light La radiated from the light source 51 is reflected by the reflection surface 53*a* of the semiconductor substrate 53, for example, as shown in FIG. 10, and then cast on the lens 41*a*. The light La is image-converted by the lens 41*a* and cast on the phase plate 43 made up of, for example, a ¼ wave plate.

The light La cast on the phase plate 43 is changed to circularly polarized light by the phase plate 43. That is, the linearly polarized light La radiated via the phase plate 43 can be changed circularly polarized light irrespective of the direction of polarization of the light radiated from the light source 51. This enables free selection of a polarized component of the light radiated from the light source 51, without inclining the polarized component of the light radiated from the light source 51 substantially 45 degrees with respect to the polarizing light splitting unit 58 as in the conventional technique.

The light La radiated from the phase plate 43 is split into light beams La1, La2, which are, for example, S-polarized light and P-polarized light, by the polarizing light splitting unit 58, and become incident on the diffraction grating 11 via the reflecting members 13*a*, 13*b*. When the incident angle of the light La1 on the diffraction grating 11 is expressed by θa, the diffraction angle of the light La1 is expressed by θa', the incident angle of the first-time diffracted light Lb1 is expressed by θb, and the diffraction angle of the first-time diffracted light Lb2 is expressed by θb', the following equations (11) and (12) hold.

$$\sin\theta a + \sin\theta a' = m\lambda/d \quad (11)$$

$$\sin\theta b + \sin\theta b' = m\lambda/d \quad (12)$$

In these equations, d represents the pitch of the diffraction grating, λ represents the wavelength of light, and m represents the order of diffraction. When a volume-type phase hologram is used for the diffraction grating 11 and Bragg diffraction is used, the light beams are made incident at incident angles that can hold θa=θa' and θb=θb'. When a volume-type phase hologram is not used for the diffraction grating, the incident angles and the diffraction angles are arbitrary angles represented by the above-described relations.

The first-time diffracted light beams Lb1, Lb2 are perpendicularly reflected by the reflectors 26 and 27, respectively. In this case, as the first-time diffracted light beams Lb1, Lb2 pass through the ¼ wave plates WP1, WP2 twice, their directions of polarization are rotated 90 degrees, respectively. Therefore, the first-time diffracted light Lb1, which is originally S-polarized light, is converted to P-polarized light, and the first-time diffracted light Lb2, which is originally P-polarized light, is converted to S-polarized light.

Next, the first-time diffracted light beams Lb1, Lb2 reflected by the reflectors 26, 27 are diffracted again by the diffraction grating 11 to become second-time diffracted light beams Lc1, Lc2 and reach the polarizing light splitting unit 58 again through the same optical paths. The polarizing light splitting unit 58 superposes and combines the second-time diffracted light Lc1, which is P-polarized light, and the second-time diffracted light Lc2, which is S-polarized light, thereby generating combined light Ld.

The combined light Ld is split into Ld1, Ld2, Ld3 and Ld4 by the light splitting films 59_1, 59_2, 59_3 and 59_4. The split combined light beams Ld1, Ld2, Ld3 and Ld4 are cast on the phase plate 43. In this case, the second-time diffracted light beams Lc1 and Lc2 become circularly polarized light beams in the opposite circular directions. When the combined light Ld is received through a polarizing plate which transmits only a specific polarized component, and a specific polarized component is taken out if first-order diffracted light is used in the first and second diffractions, an interference signal I as expressed by the following equation (13) is provided with respect to the combined light Ld.

$$I = A1^2 + A2^2 + 2*A1*A2\cos(4*K*x+\delta) \quad (13)$$

In this equation, A1, A2 represent the amplitudes of the two superposed second-time diffracted light beams Lc1 and Lc2, x represents the quantity of shift of the diffraction grating 11 in the direction of lattice vector, δ represents the initial phase, and K=2π/d (d representing the lattice pitch). This interference signal I changes by one cycle as the diffraction grating 11 shifts by the amount of d/4 in the direction of lattice vector. δ represents the quantity dependent on the difference in optical path length between the two superposed second-time diffracted light beams Lc1, Lc2.

Of the combined light beams Ld1, Ld2, Ld3 and Ld4 radiated from the phase plate 43, only predetermined polarized components are transmitted by the polarizing units 42. The polarizing units 42 are set at ab interval of 45 degrees from each other. In this example, the polarizing unit 42_1 transmits only a polarized component in the direction of polarization of 0 degree, and the polarizing unit 42_2 transmits only a polarized component in the direction of polarization of 45 degrees. The polarizing unit 42_3 transmits only a polarized component in the direction of polarization of 90 degree, and the polarizing unit 42_4 transmits only a polarized component in the direction of polarization of 135 degrees. The intensities of the coherent light beams Ld1, Ld2, Ld3 and Ld4 transmitted through the polarizing units 42 are expressed by the following equations (21) to (24).

$$B + A\cos(4*K*x+\delta) \quad (21)$$

$$B + A\cos(4*K*x+90°+\delta) \quad (22)$$

$$B+A\cos(4*K*x+180°+\delta) \quad (23)$$

$$B+A\cos(4*K*x+270°+\delta) \quad (24)$$

$$B=¼(A1^2+A2^2)$$

$$A=½*A1*A2$$

Equation (21) expresses the intensity of the coherent light Ld1 transmitted through the polarizing unit 42_1. Equation (22) expresses the intensity of the coherent light Ld2 transmitted through the polarizing unit 42_2. Equation (23) expresses the intensity of the coherent light Ld3 transmitted through the polarizing unit 42_3. Equation (24) expresses the intensity of the coherent light Ld4 transmitted through the polarizing unit 42_4. Image formation of the coherent light beams Ld1, Ld2, Ld3 and Ld4 expressed by these equations on the light-receiving elements 51_1, 51_2, 51_3 and 51_4 is performed via the lenses 41_1, 41_2, 41_3 and 41_4. That is, each light-receiving element 52 photoelectrically converts the coherent light Ld expressed by the above-described equations, thus generating an interference signal.

As subtraction between equation (21) and equation (23) is carried out, the DC component of the interference signal can be removed. Similarly, as subtraction between equation (22) and equation (24) is carried out, the DC component of the interference can be removed. Since the signals of the subtraction have phases difference from each other by 90 degrees, a signal for detecting the direction of shift of the diffraction grating can be acquired.

Figure 12:
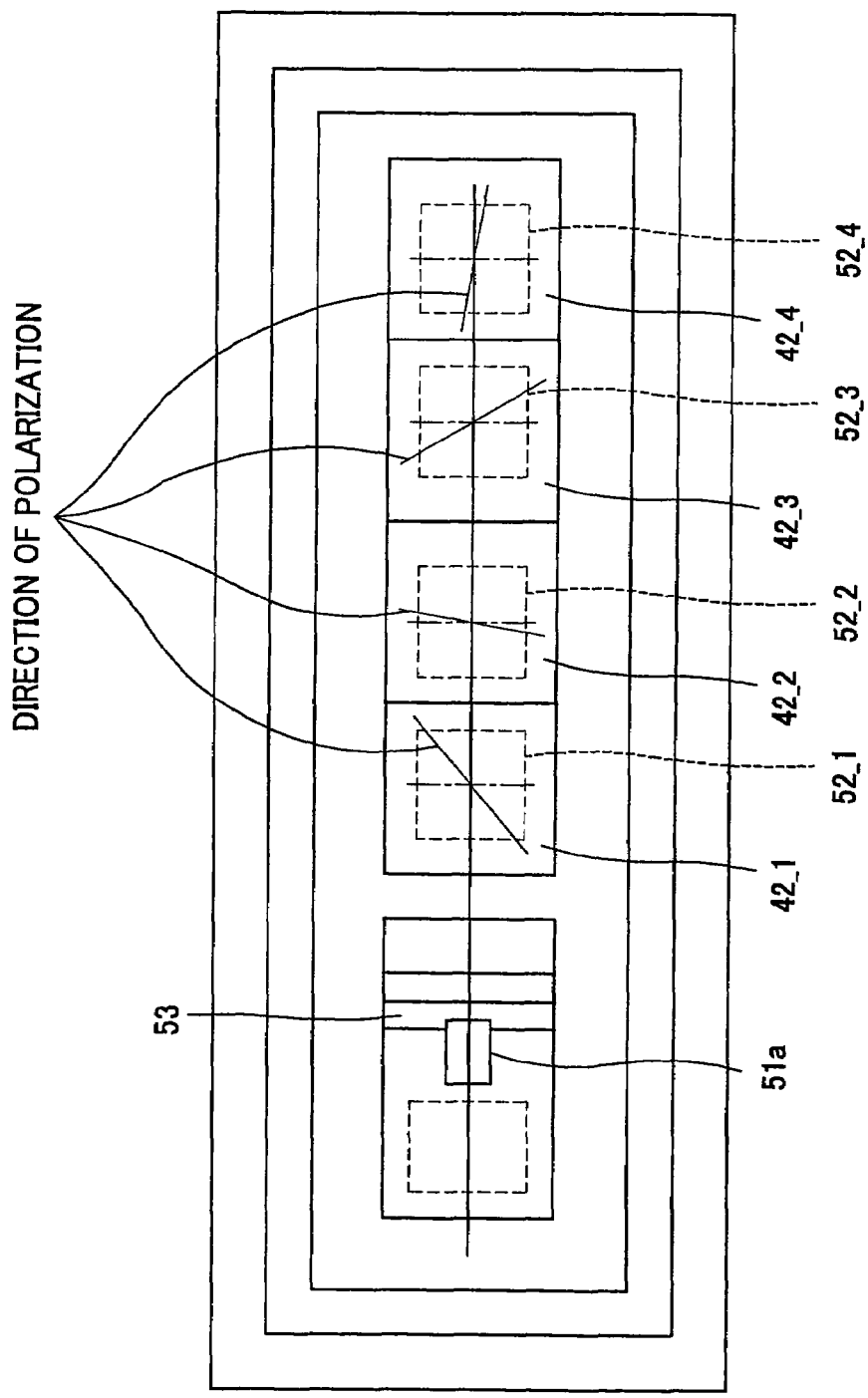
FIG. 12 is a view showing the light-receiving/emitting composite unit, as viewed from the top.

In this manner, in the displacement detection device 10 to which the present invention is applied, the phase plate 43 is stacked to be inserted between the polarizing units 42 and the light splitting unit 44. This phase plate 43 can convert the linearly polarized light La to circularly polarized light and then cast it on the polarizing light splitting unit 58. This enables free selection of a polarized component of the light La radiated from the light source 51, without arranging the light source 51 in such a manner that the polarized component of the light La radiated from the light source 51 has an angle of about 45 degrees to the polarizing light splitting unit 58 as in the conventional technique. Accordingly, the problem that an excessively large space for arranging the components is necessary in the light-receiving/emitting unit 12 can be solved and a more compact structure can be realized. Moreover, this phase plate 43 can receive the combined light beams Ld1, Ld2, Ld3 and Ld4 radiated from the light splitting films 59_1, 59_2, 59_3 and 59_4, then convert these light beams to linearly polarized light beams with their directions of polarization rotated, and radiate the linearly polarized light beams to the above-described polarizing units 42. Therefore, it suffices to arrange the directions of polarization of the polarizing units 42 at an interval of 45 degrees from each other (for example, at 50 degrees, 5 degrees, 140 degrees and 95 degrees), as viewed from the top, as shown in FIG. 12. The restraint in mounting the polarizing units 42 can be reduced and simplification of the manufacturing process and reduction in the manufacturing cost can be realized. Furthermore, since this single phase plate 43 handles both the conversion of the light La from the light source 51 and the conversion of the light Ld from the light splitting films 59, dimensional control is made easier and further reduction in the manufacturing cost can be realized.

A displacement detection device according to a second embodiment of the present invention will now be described. The same constituent elements and members as those of the displacement detection device 10 of the first embodiment are denoted by the same numerals, referring to the description of first embodiment, and will not be described further in detail in this embodiment.

Figure 13:
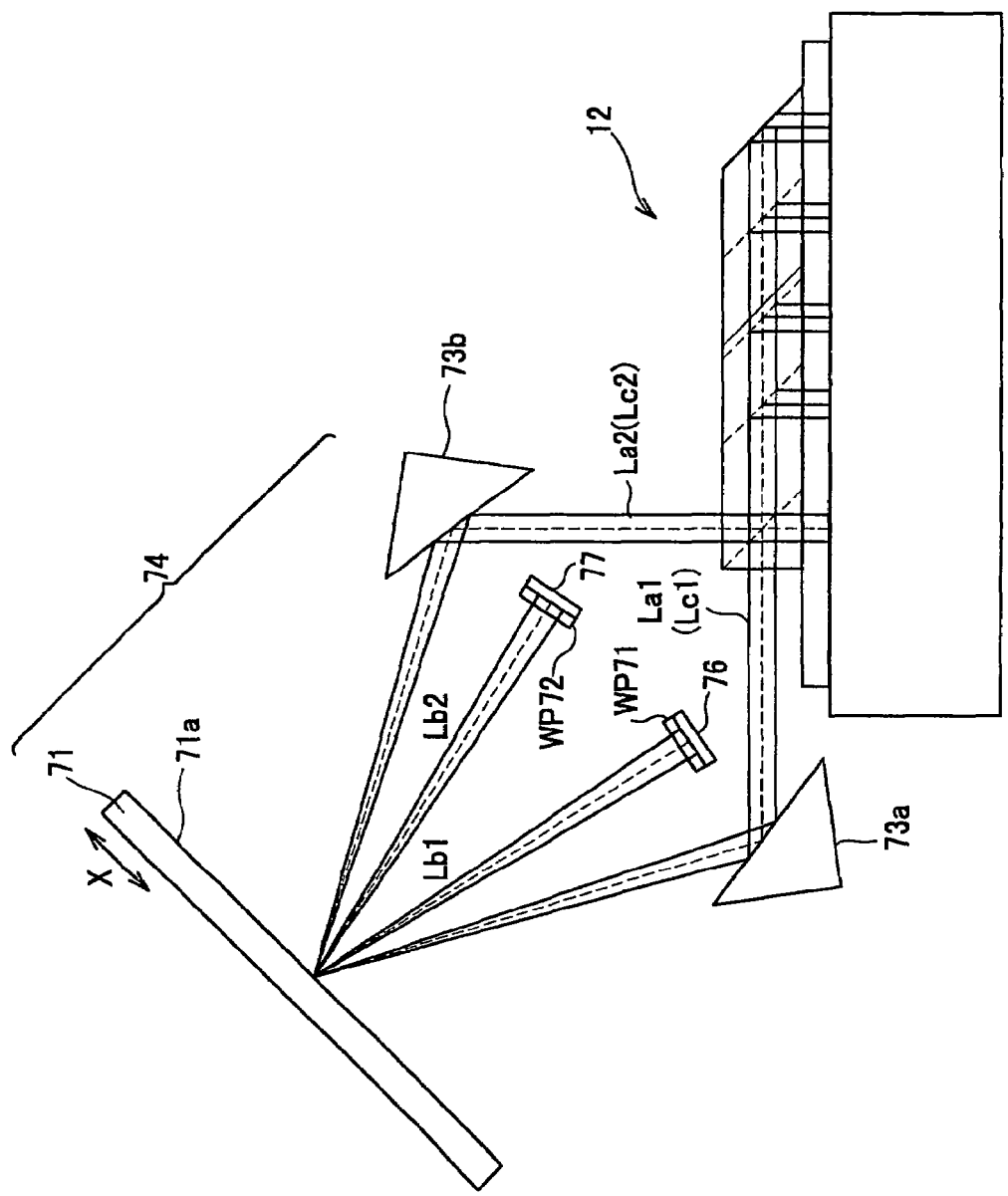
FIG. 13 is a view for explaining a displacement detection device using a reflection-type diffraction grating.

A displacement detection device 70 according to the second embodiment of the present invention has a reflection-type diffraction grating 71 which is mounted on a moving part of a machine tool or the like and linearly moves, a light-receiving/emitting composite unit 12 for splitting light emitted from a light-emitting element into two light beams La1, La2 and radiating the two light beams and for causing two second-time diffracted light beams Lc1, Lc2 diffracted by the diffraction grating 71 to interfere with each other and thus detecting an interference signal, reflecting members 73a, 73b for casting the two light beams La1, La2 radiated from the light-receiving/emitting composite unit 12 onto the diffraction grating 71 and leading the two second-time diffracted light beams Lc1, Lc2 from the diffraction grating 71 to the light-receiving/emitting composite unit 12, and a reflection optical system 74 for reflecting two first-time diffracted light beams Lb1, Lb2 from the diffraction grating 71 and casting the first-time diffracted light beams again on the diffraction grating 71, as shown in FIG. 13.

The diffraction grating 71 has, for example, a thin plate-like shape and has narrow slits or grooves, or lattices with distributed refractive index, engraved at predetermined intervals on its surface. Light incident on such a diffraction grating 71 is diffracted by the slits or the like engraved on the surface and reflected by the diffraction grating 71. The diffracted light due to the diffraction is generated in a direction defined by the interval of the lattice and the wavelength of the light.

In the present invention, the type of the diffraction grating is not limited. Not only a diffraction grating having a mechanically formed grooves or the like as described above but also a diffraction grating prepared by, for example, printing interference fringes on a photosensitive resin, may be used.

The reflecting member 73a reflects the light La1 and casts the light La1 at a predetermined position on a lattice plane 71a of the diffraction grating 71. As this light La1 is diffracted by the diffraction grating 71, the first-time diffracted light Lb1 is provided. The reflecting member 73b reflects the light La2 and casts the light La2 at a predetermined position on the lattice plane 71a of the diffraction grating 71. As this light La2 is diffracted by the diffraction grating 71, the first-time diffracted light Lb2 is provided.

Moreover, the second-time diffracted light Lc1, generated as the first-time diffracted light Lb1 is diffracted by the diffraction grating 71, is cast on the reflecting member 73a. The reflecting member 73a reflects this second-time diffracted light Lc1 and casts the second-time diffracted light Lc1 on the light-receiving/emitting composite unit 12. The second-time diffracted light Lc2, generated as the first-time diffracted light Lb2 is diffracted by the diffraction grating 71, is:cast on the reflecting member 73b. The reflecting member 73b reflects this second-time diffracted light Lc2 and casts the second-time diffracted light Lc2 on the light-receiving/emitting composite unit 12.

Image formation is performed in such a manner that the predetermined position at which the light is cast by the reflecting member 73a on the lattice plane 71a of the diffraction grating 71 and the predetermined position at which the light is cast by the reflecting member 73b on the lattice plane 71a of the diffraction grating 71 are the same position. In this case, it is desired that the beam diameter is such a size that the beam is not affected by dust and scratches on the lattice plane 71a. The image forming point need not necessarily be the point where the minimum beam diameter is obtained, and a point where the difference in optical path length within the beam image is at its minimum may be situated on the lattice plane 71a.

The reflection optical system 74 has a reflector 76 for reflecting the first-time diffracted light Lb1 and casting the first-time diffracted light Lb1 again on the diffraction grating 71, a reflector 77 for reflecting the first-time diffracted light Lb2 and casting the first-time diffracted light Lb2 again on the diffraction grating 71, a ¼ wave plate WP71 for changing the polarization state of the first-time diffracted light Lb1, and a ¼ wave plate WP72 for changing the polarization state of the first-time diffracted light Lb2.

The first-time diffracted light Lb1 which has passed through the ¼ wave plate WP71 is cast on the reflector 76. The reflector 76 perpendicularly reflects the first-time diffracted light Lb1 so that this first-time diffracted light Lb1 returns on the same path as the path of incidence. Since the first-time diffracted light Lb1 cast on the reflector 76 has already passed through the ¼ wave plate WP71 and the first-time diffracted light Lb1 reflected by this reflector 76 passes through the ¼ wave plate WP71 again, the first-time diffracted light Lb1 is cast again on the diffraction grating 71 with its direction of polarization rotated 90 degrees.

The first-time diffracted light Lb2 which has passed through the ¼ wave plate WP72 is cast on the reflector 77. The reflector 77 perpendicularly reflects the first-time diffracted light Lb2 so that this first-time diffracted light Lb2 returns on the same path as the path of incidence. Since the first-time diffracted light Lb2 cast on the reflector 77 has already passed through the ¼ wave plate WP72 and the first-time diffracted light Lb2 reflected by this reflector 77 passes through the ¼ wave plate WP72 again, the first-time diffracted light Lb2 is cast again on the diffraction grating 71 with its direction of polarization rotated 90 degrees.

As for the details of the light-receiving/emitting composite unit 12 of the second embodiment and an exemplary operation of the second embodiment, the description of the first embodiment is referred to.

Specifically, in the displacement detection device 70 using the reflection-type diffraction grating 71 according to the second embodiment, as the light-receiving/emitting composite unit 12 has the integrated structure by packaging the respective members, precise position adjustment is easier. Moreover, since the installation space for the components need not be large, reduction in size and weight of the displacement detection device as a whole can be realized. As the members are housed in the same housing unit, the influence of environmental changes and changes with the lapse of time can be reduced, and deviation and the like at the time of adjustment can be restrained to the minimum level. Thus, the reliability of the whole light-receiving/emitting composite unit 12 can be increased.

Also in the second embodiment, since the single phase plate 43 handles both the conversion of the light La from the light source 51 and the conversion of the light Ld from the light splitting films 59, dimensional control is made easier and further reduction in the manufacturing cost can be realized.

Figure 14:
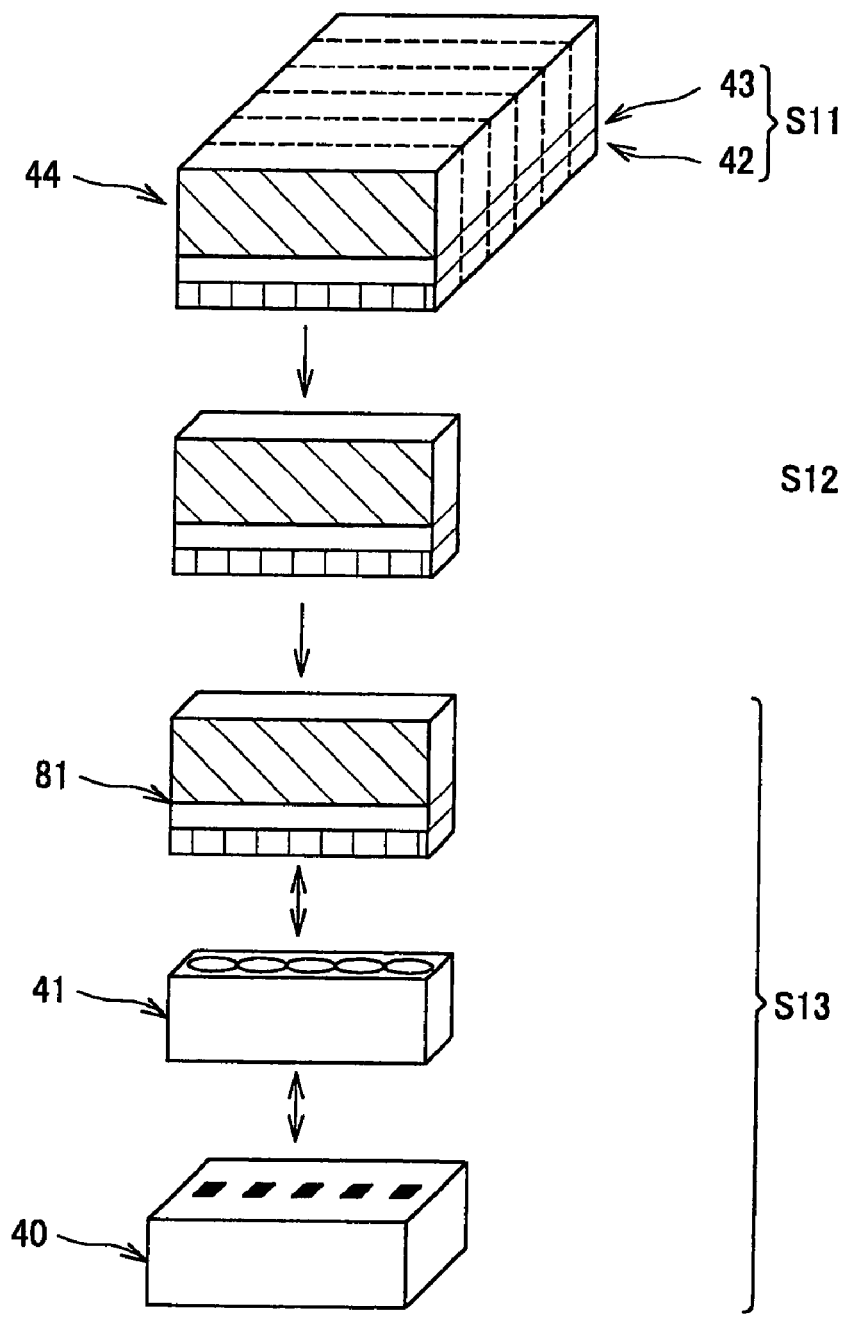
FIG. 14 is a view for explaining a method for preparing a light-receiving/emitting composite unit.

A method for preparing the light-receiving/emitting composite unit 12 to which the present invention is applied will now be described with reference to FIG. 14.

First, at step S11, a light splitting unit 44 layer having plural light splitting units 44 sequentially connected with each other, a phase plate 43 for the area covering plural light-receiving/emitting composite units 12, and a polarizing unit 42 layer having plural polarizing units 42 sequentially connected with each other are prepared. Then, the light splitting unit 44 layer, the phase plate 43, and the polarizing unit 42 layer are sequentially stacked to prepare a multilayer board 81. When preparing this multilayer board 81, the phase plate 43 may be stacked on the polarizing unit 42 layer and then the light splitting unit 44 layer may be stacked thereon. Alternatively, the phase plate 43 may be stacked on the light splitting unit 44 layer and then the polarizing unit 42 layer may be stacked thereon.

At the next step S12, the prepared multilayer board 81 is sliced and divided into plural multilayer boards. Each of the multilayer boards obtained by this division at step S12 is equivalent to one light-receiving/emitting composite unit 12.

At the next step S13, a composite lens unit 41 is joined with each of the individual multilayer boards 81 obtained by the division, and a housing member 40 is joined with the joined composite lens unit 41.

That is, in the process of preparing the light-receiving/emitting composite unit 12 to which the present invention is applied, optical components of a size that can be easily processed are first bonded to each other, then sliced to a size for constituting each light-receiving/emitting composite unit 12, and the composite lens unit 41 and the housing member 40 are finally bonded to complete the light-receiving/emitting composite unit 12. Therefore, the production process can be simplified and the manufacturing cost can be reduced.

Particularly as the light-receiving/emitting composite unit 12 according to the present invention has the integrated structure by packaging the respective members, precise position adjustment is easier. Moreover, since the installation space for the components need not be large, reduction in size and weight of the displacement detection device as a whole can be realized. Therefore, the above-described manufacturing process can be employed and further reduction in size and price can be realized.

The displacement detection devices of the first and second embodiments to which the present invention is applied are described above. While the displacement detection devices of the embodiments use the diffraction gratings 11, 71 having lattices provided in parallel at predetermined intervals, the diffraction grating of the present invention need not be to a diffraction grating having such lattices provided in parallel. For example, angle detection may be performed using a diffraction grating having radial lattices provided thereon such as a rotary encoder.

In the present invention, an amplitude-type diffraction grating on which light and darkness is recorded, or a phase-type diffraction grating on which changes in refractive index or shapes in shape are recorded, may be used, and the type of the diffraction grating is not limited.

In the displacement detection devices of the embodiments, the diffraction gratings 11, 71 are mounted on a moving part of a machine tool or the like and shift in accordance with the movement of the moving part. However, in the present invention, it suffices that the diffraction gratings 11, 71 and the displacement detection devices shift relatively.

The present invention is not limited to the above-described embodiments. For example, the following structure that enable reduction of errors based on changes in wavelength of the light source 51 may be employed.

When the wavelength of the light source changes, if there is a difference between the optical path length from the polarizing light splitting unit 58 to the reflector 26 and the optical path length from the polarizing light splitting unit 58 to the reflector 27 (hereinafter this difference in optical path length is referred to as ΔL), a measurement error occurs. The amount of error E can be expressed as follows.

$$E = \Delta\lambda/\lambda^2 * \Delta L * 4/d \quad (45)$$

In this equation, λ represents the wavelength of the light source 51, Δλ represents the quantity of change in wavelength, ΔL represents the difference in optical path length between two light beams obtained by splitting by the polarizing light splitting unit 58, and d represents the lattice pitch of the diffraction grating 11.

In this case, ΔL must be small so that the amount of error E is within an allowable range with respect to an assumed change in wavelength Δλ. The optical path length is set so that with respect to the lens 41a and the lenses 41_1, 41_2, 41_3 and 41_4, individual radiated light beams are converged at specific points (including virtual image points, but not including points at infinity). In this embodiment, since the two light beams obtained by splitting by the polarizing light splitting unit 58 pass through the same lens 41a, the lengths between the respective points of convergence and the light source 51, which is the light-emitting point, are equal. When individual lenses are used for the two light beams obtained by splitting by the polarizing light splitting unit, these lengths are made equal using lenses having the same focal length and the same shape.

Figure 15:
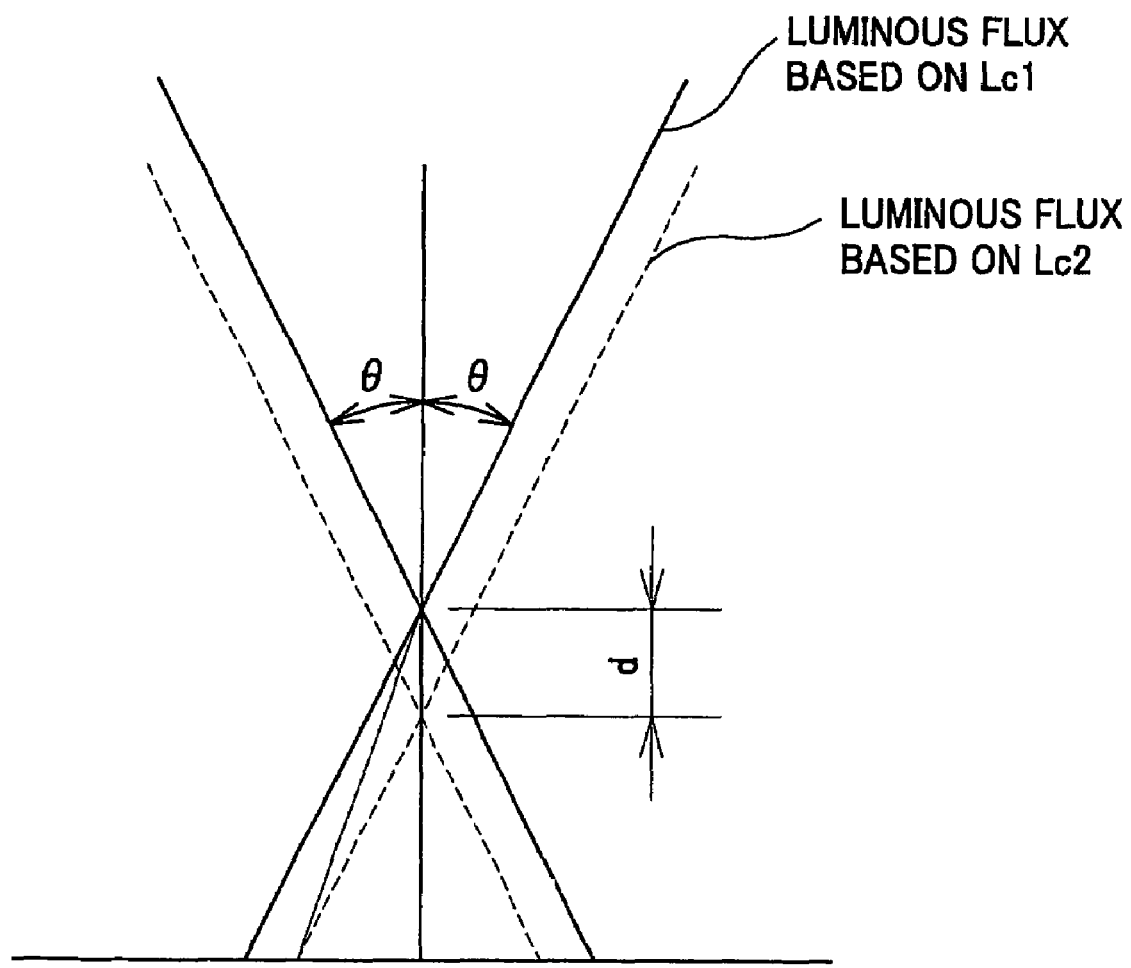
FIG. 15 is a view showing the tendency of light Ld near a light-receiving element.

FIG. 15 shows the tendency of the light Ld near the light-receiving elements 52 in this case. In FIG. 15, d represents the quantity of deviation between the positions of convergence of the two light beams. In the case where a solid line represents a luminous flux based on the second-time diffracted light Lc1 of the two light beams and a broken line represents a luminous flux based on the second-time diffracted light Lc2, only when the optical path lengths of the two light beams are equal, d=0 is realized and the two luminous fluxes are superposed on each other. When the optical path length of the two light beams are difference, d≠0 holds and concentric interference fringes are generated, thus reducing the intensity of the interference signal. Therefore, by maximizing the interference signal or adjusting the positions of the reflectors 26, 27 (30a) so that the interference image has null fringe, it is possible to equalize the optical path lengths of the two light beams irrespective of the coherence length of the light source 51.

As the optical path lengths can be equalized, the measurement error can be reduced even when the wavelength of the light source changes, in accordance with the above-described equation (45).

In the present invention, the lenses of the composite lens unit 41 may be adjusted in the following manner.

Figure 16A:
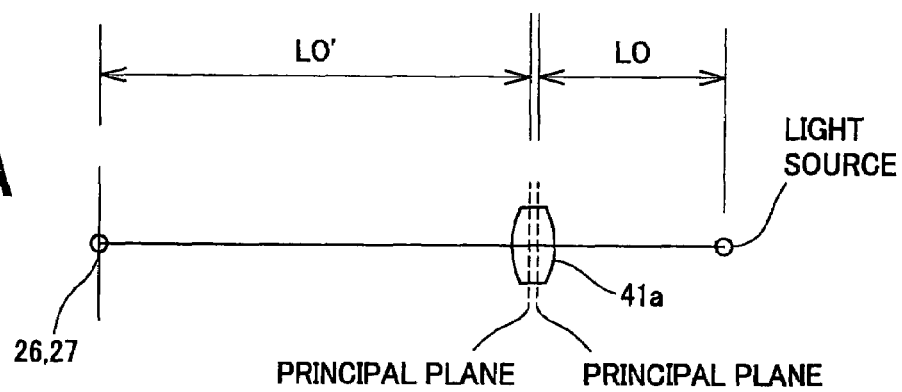
FIGS. 16A and 16B are views for explaining the positional relation between a light source, a reflector and a light-receiving element.
Figure 16B:
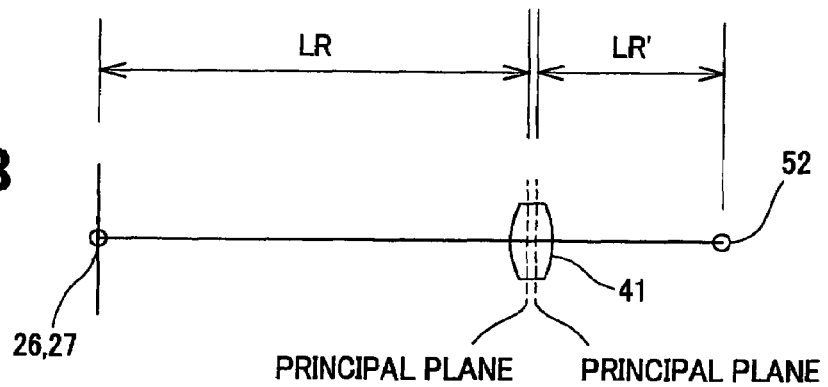

FIG. 16A shows the positional relation between the light-emitting point of the light source 51 and the reflectors 26, 27 (reflection surface 30a). FIG. 16B shows the positional relation between the reflectors 26, 27 (reflection surface 30a) and the light-receiving elements 52. The lens 41a and the lenses 41_1, 41_2, 41_3 and 41_4 are set to satisfy the following geometrical-optical image forming relations.

$$1/LO + 1/LO' = 1/FO \quad (31)$$

$$1/LR + 1/LR' = 1/FR \quad (32)$$

Figure 17:
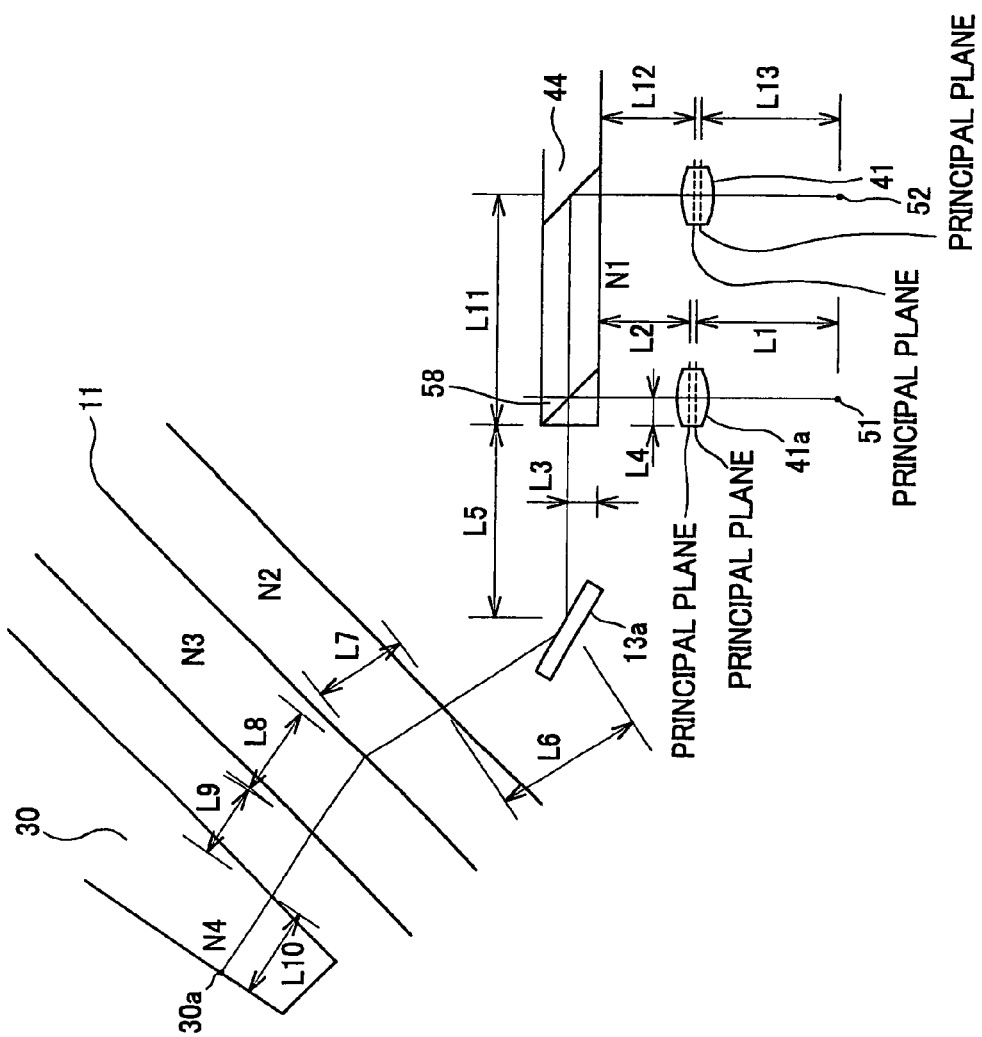
FIG. 17 is a view for explaining the case of actually arranging a lens in the displacement detection device to which the present invention is applied.

In these equations, FO represents the focal length of the lens 41a, and FR represents the focal length of the lenses 41_1, 41_2, 41_3 and 41_4. LO, LO', LR and LR' represent geometrical-optical lengths, that is, lengths from the principal planes of the respective lenses 41. These lengths are expressed by the following equations, for example, in the case of an optical system shown in FIG. 17.

$$LO = L1 \quad (41)$$

$$LO' = L2 + (L12 + L3 + L4)/N1 + L5 + L6 + (+7+L8)/N2 + L9 + L10/N3 \quad (42)$$

$$LR = L10/N3 + L9 + (L7 + L8)/N2 + L6 + L5 + (L11 + L3)/N1 + L12 \quad (43)$$

$$LR' = L13 \quad (44)$$

In these equations, N1 represents the refractive index of the polarizing light splitting unit 58 and the light splitting films 59, N2 represents the refractive index of the diffraction grating 11, and N3 represents the refractive index of the reflection prism. Specifically, in the example shown in FIG. 17, when the lenses are arranged to satisfy equations (41) to (44), a geometrical-optical image of the light-emitting point is formed on the reflectors 26, 27 and the image on the reflectors 26, 27 is formed on the light-receiving elements 52. That is, as the lenses are arranged to satisfy equations (41) to (44), the light source 51 and the reflectors 26, 27 (30a) are arranged at substantially conjugate positions in the geometrical-optical image forming relation, and the reflectors 26, 27 (30a) and the light-receiving elements 52 are arranged at substantially conjugate positions in the geometrical-optical image forming relation.

Figure 18:
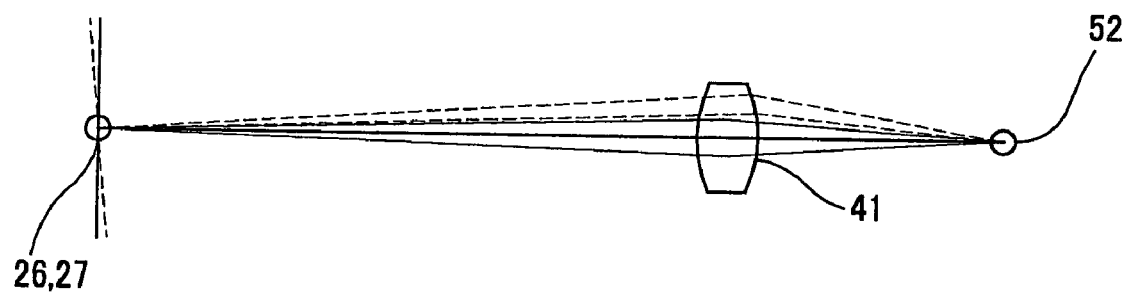
FIG. 18 is a view for explaining the case where the reflector rotates.

In the displacement detection device 10 employing such an optical system, even when the reflectors 26, 27 are rotated, for example, as shown in FIG. 18, the position of the image forming point on each light-receiving element 52 does not change. That is, though the angle of the light Ld incident on each light-receiving element 52 changes, the position of the image forming point on the light-receiving element 52 does not change and the optical path length does not change, either. Therefore, the interference signal does not change.

In the displacement detection device 10 to which the present invention is applied, the above-described length LR' may be set to be smaller than the length LR (LR'/LR≦1). The ratio of the amount of shift of the image forming point on the light-receiving elements 52 to the amount of shift of the image forming point on the reflectors 26, 27 is expressed by LR'/LR. Therefore, as the value of LR'/LR is decreased, the amount of shift of the image forming point on the light-receiving surface can be restrained. That is, as the length LR' is set to realize LR'/LR≦1, the amount of shift of the image forming point on the light-receiving elements 52 can be made smaller than the amount of shift of the image forming point on the reflectors 26, 27, and lowering of the intensity of the interference signal can be restrained. Particularly in the present invention where the light-receiving/emitting composite unit 12 has the housing member 40, the composite lens unit 41, the polarizing units 42, the phase plate 43 and the light-splitting unit 44 arranged within the same package and constituting independent units, LR' can be set at an extremely small value and therefore LR'/LR can be made small.

That is, in the displacement detection device 10 to which the present invention is applied, as the lenses constituting the composite lens unit 41 are arranged as described above, the deviation on the light-receiving elements 52 can be restrained to the minimum level and its influence on the interference signal can be reduced even when the diffraction grating 11 or the reflectors 26, 27 are rotated.

If the light radiated from the lenses 41 of the composite lens unit 41 is converged when the lenses 41 have a small aperture, the beam diameter of the formed image is too small and might be affected by dust and scratches. Therefore, the composite lens unit 41 may diverge the radiated light to such an extent that the light is not affected by dust and scratches at the image forming point.

Alternatively, the lenses 41 of the composite lens unit 41 may keep the beam diameter on the diffraction grating 11 and the light-receiving elements 52 by collimating the radiated light. As this enables realization of a constant beam diameter of light, the allowable width in the directions E1 and E2 can be increased when mounting the diffraction grating 11, as shown in FIG. 8.

By focusing the light radiated from the lens 41$a$ on the reflectors 26, 27 or collimating the light, it is possible to adjust the light beams La1, La2 incident on the diffraction grating 11 and the reflected light beams Lb1, Lb2 so that these light beams take the same optical path.

The displacement detection device to which the present invention is applied is not limited to the above-described embodiments. For example, the present invention can be applied to the following structures. Of these structures, the same constituent elements and members as those of the displacement detection device 10 shown in FIGS. 7 and 9 are denoted by the same numerals and will not be described further in detail.

Figure 19:
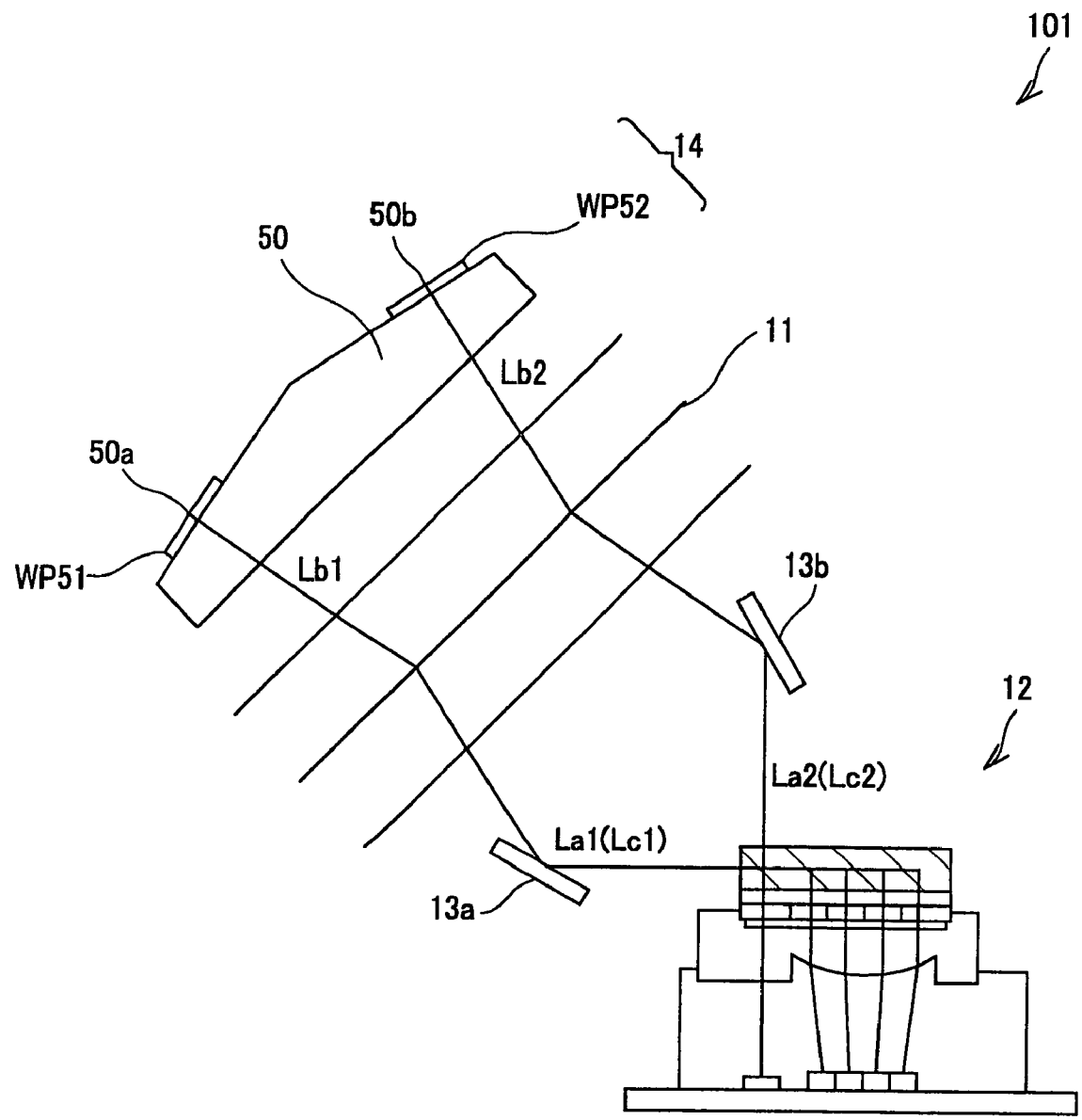
FIG. 19 is a view for explaining another embodiment of the displacement detection device according to the present invention.

A displacement detection device 101 shown in FIG. 19 uses a reflection prism 50 for a reflection optical system 14, and has a ¼ wave plate WP51 for transmitting only a first-time diffracted light Lb1 and a ¼ wave plate WP52 for transmitting only a first-time diffracted light Lb2. The first-time diffracted light beams Lb1, Lb2 transmitted through these ¼ wave plates WP51, WP52 are reflected by reflection surfaces 50$a$, 50$b$. That is, the ¼ wave plates are separated arranged, compared with the reflection optical system shown in FIG. 9.

Figure 20:
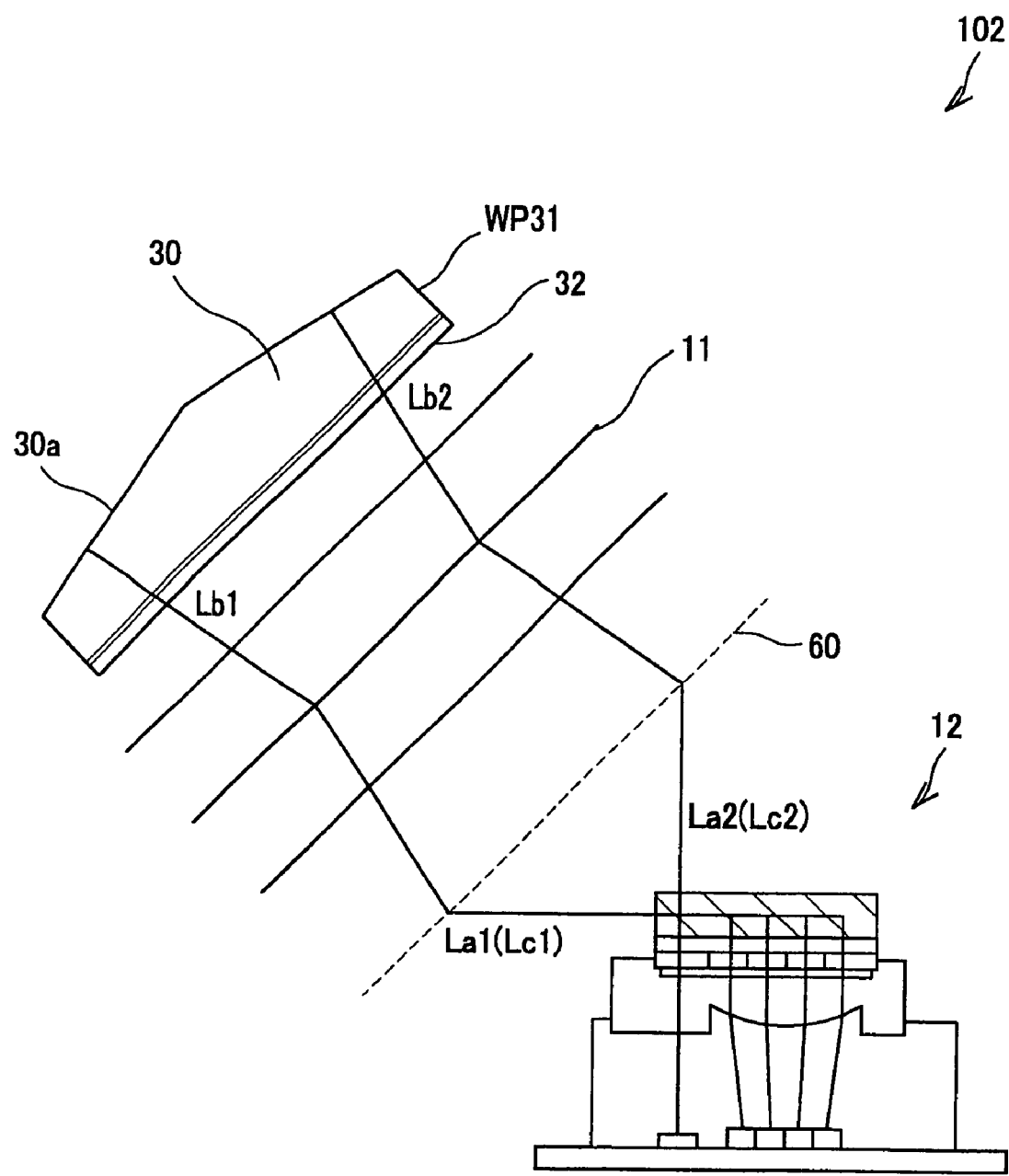
FIG. 20 is a view for explaining another embodiment of the displacement detection device according to the present invention.

A displacement detection device 102 shown in FIG. 20 uses a diffraction grating 70 instead of the reflecting members 13$a$, 13$b$ shown in FIG. 7. This diffraction grating 70 changes the directions of incident light beams La1, La2, Lc1, Lc2 and made these light beams incident on a diffraction grating 11 or a light-receiving/emitting composite unit 12.

Figure 21:
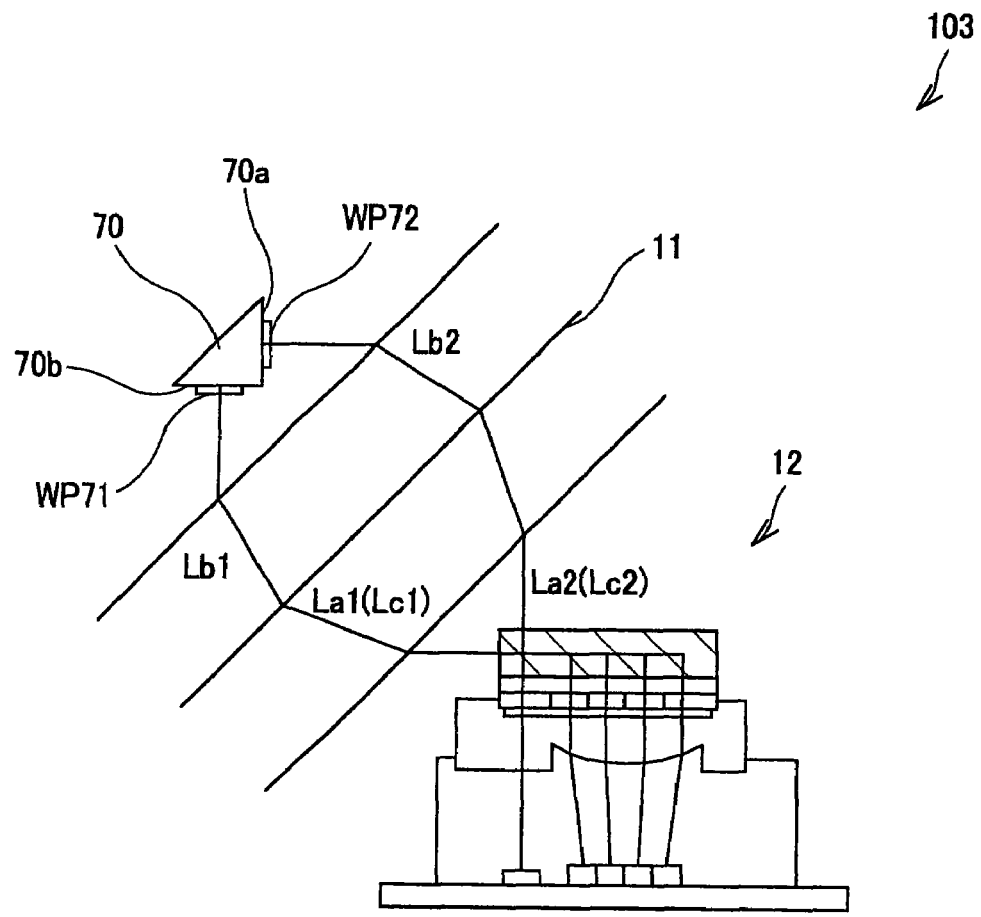
FIG. 21 is a view for explaining another embodiment of the displacement detection device according to the present invention.

A displacement detection device 103 shown in FIG. 21 has a structure in which the reflection members 13$a$, 13$b$ shown in FIG. 7 are not provided. The displacement detection device 103 has a reflection prism 70 having reflection surfaced 70$a$, 70$b$ and ¼ wave plates WP71, WP72 arranged on the reflection surfaces 70$a$, 70$b$.

Figure 22:
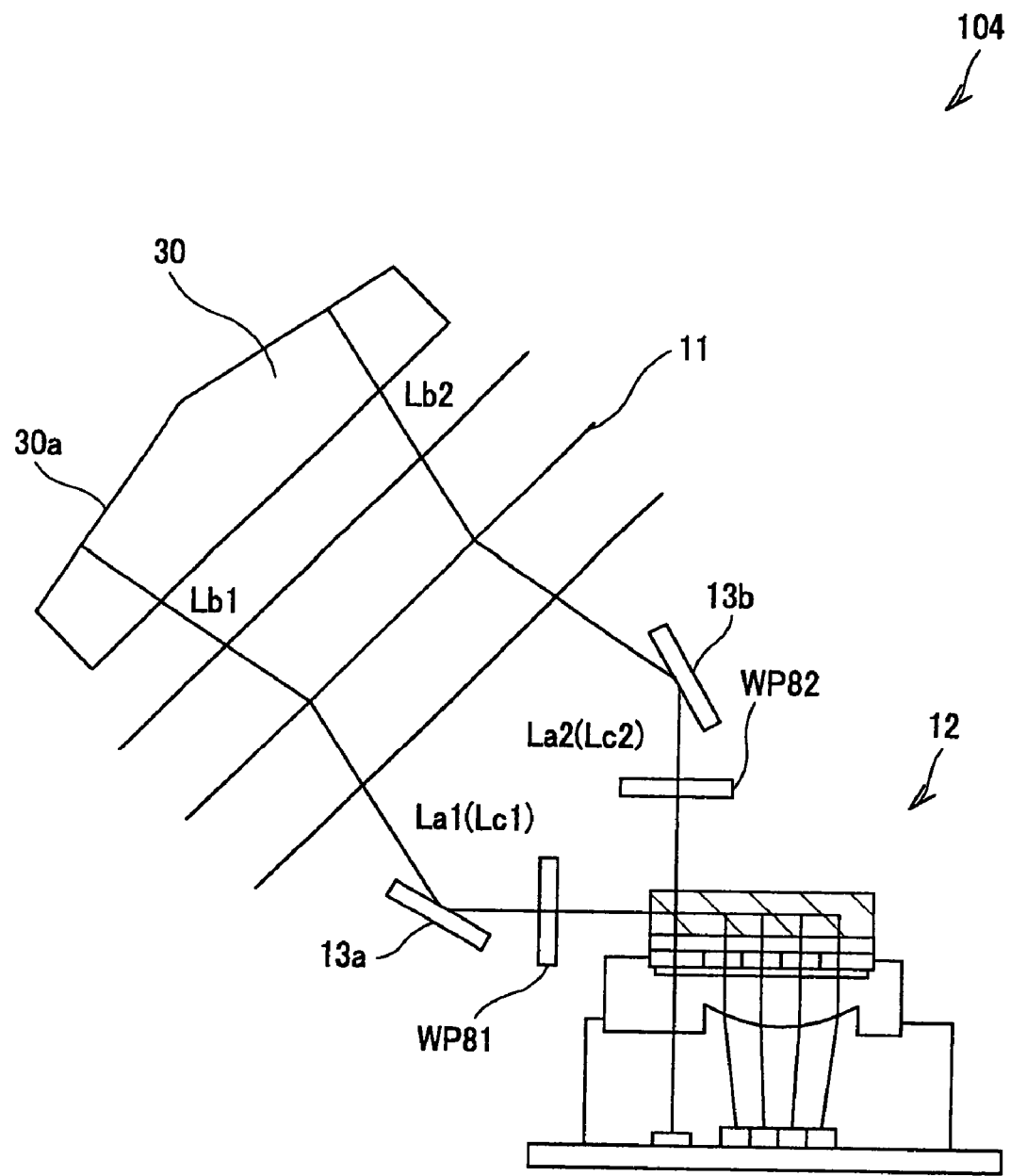
FIG. 22 is a view for explaining another embodiment of the displacement detection device according to the present invention.

A displacement detection device 104 shown in FIG. 22 has ¼ wave plates WP81, WP82 provided between a diffraction grating 11 and a light-receiving/emitting composite unit 12 (including a light source 51). The optical axes of the ¼ wave plates WP81, WP82 are inclined 45 degrees to the axes of polarization of light beams La1, La2 radiated from the light-receiving/emitting composite unit 12.

The diffraction grating of each of the displacement detection devices shown in FIGS. 19 to 22 may be sandwiched by scales made of glass boards.

Figure 23:
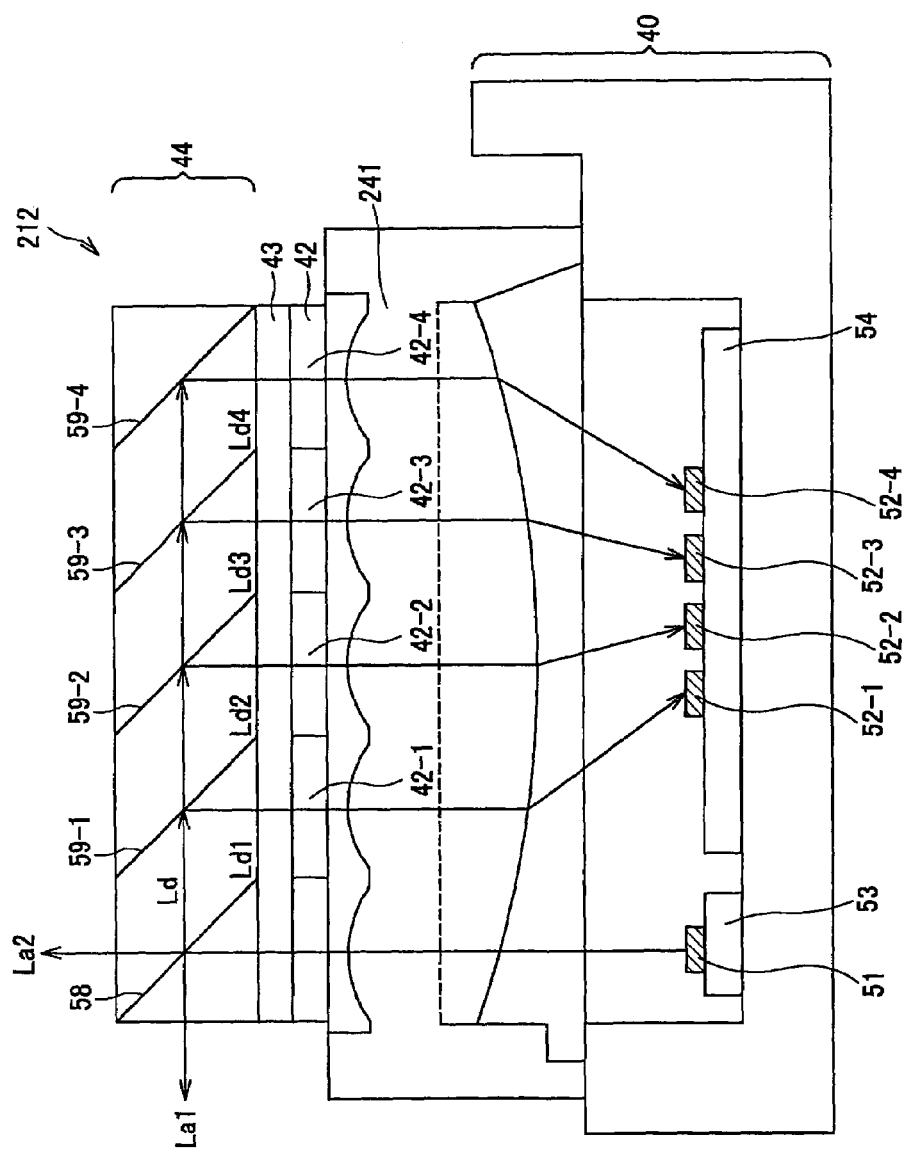
FIG. 23 is another structural view of the light-receiving/emitting composite unit.

Instead of the above-described light-receiving/emitting composite unit 12, for example, a light-receiving/emitting composite unit 212 shown in FIG. 23 may be used. Of the light-receiving/emitting composite unit 212 shown in FIG. 23, the same constituent elements and members as those of the above-described light-receiving/emitting composite unit are denoted by the same numerals and will not be described further in detail.

The light-receiving/emitting composite unit 212 has a housing member 40 for housing a light-emitting element and a light-receiving element, a lens unit 241, polarizing units 42 (42_1, 42_2, 42_3 and 42_4) for transmitting only a predetermined polarized component, a phase plate 43 for changing the polarization state of light, and a light splitting unit 44 for splitting light to be incident on the diffraction grating 11 or splitting second-time diffracted light beams Lc1, Lc2 obtained by diffraction by the diffraction grating 11.

The housing member 44 has a light source 51 for radiating light La, light-receiving elements 52 (52_1, 52_2, 52_3 and 52_4) for photoelectrically converting coherent light, which will be described later, to generate an interference signal, a semiconductor substrate 53 having the light source 51 installed thereon and adapted for controlling the optical path by applying an electric signal thereon or using a reflection surface 53$a$, and a semiconductor substrate 54 having the light-receiving elements installed thereon and adapted for taking out an electric signal.

The light splitting unit 44 has a polarizing light splitting unit 58 for splitting the light La radiated from the light source 51 into two light beams La1, La2 and radiating these two light beams La1, La2 and for combining second-time diffracted light beams Lc1, Lc2 from the reflecting members 13$a$, 13$b$ and thus generating combined light Ld, and light splitting films 59_1, 59_2, 59_3 and 59_4 for splitting the combined light Ld cast from the polarizing light splitting unit 58 into combined light beams Ld1, Ld2, Ld3 and Ld4.

The lens unit 241 is an optical element such as a lens having a predetermined numerical aperture. The light La radiated from the light source 51 becomes incident on the lens unit 241. The lens unit 241 causes image formation of the incident light La with a predetermined beam diameter on the lattice plane 11$a$ of the diffraction grating 11 or the reflectors 26, 27. In the first embodiment, since the transmission-type diffraction grating 11 is used, the radiated light La is usually caused to form an image on the reflectors 26, 27. Therefore, the beam diameter of the light cast on the lattice plane 11$a$ can be increased and the influence of dust and scratches can be reduced. As the lens unit 241 for controlling both the beam diameter of the light radiated to outside and the beam diameter of the received light is arranged within the same package, the degree of integration can be increased and the preparation process can be simplified. Thus, the reliability of the whole device can be improved.

Also the coherent light beams Ld1, Ld2, Ld3 and Ld4 radiated from the polarizing units 42 become incident on the lens unit 241. The lens unit 241 causes the incident coherent light beams Ld1, Ld2, Ld3 and Ld4 to form an image on the light-receiving elements 52_1, 52_2, 52_3 and 52_4, respectively. The image forming point need not be a point where the beam diameter is at its minimum. For example, a point which realizes the minimum difference in optical path length within the beam image may be situated on the light-receiving surface. The lens unit 241 may not only converge a beam but also radiate collimated light or divergent light.

Although the lens unit 241 realizes image formation of the incident light La and image formation of the coherent light beams Ld1, Ld2, Ld3 and Ld4 using a single lens unit, the lens unit is not limited to this structure, and for example, plural lens units may be used. Since the lens constituting the lens unit 241 causes image formation of plural incident light beams at a desired position, various shapes can be applied. For example, when a narrow spacing is to be set between the light-receiving elements 52, the spacing between the coherent light beams Ld1, Ld2, Ld3 and Ld4 needs to be gradually made smaller. Therefore, the shape of the lens unit 241 is made convex toward the light-receiving elements 52, as shown in FIG. 23.

Figure 24:
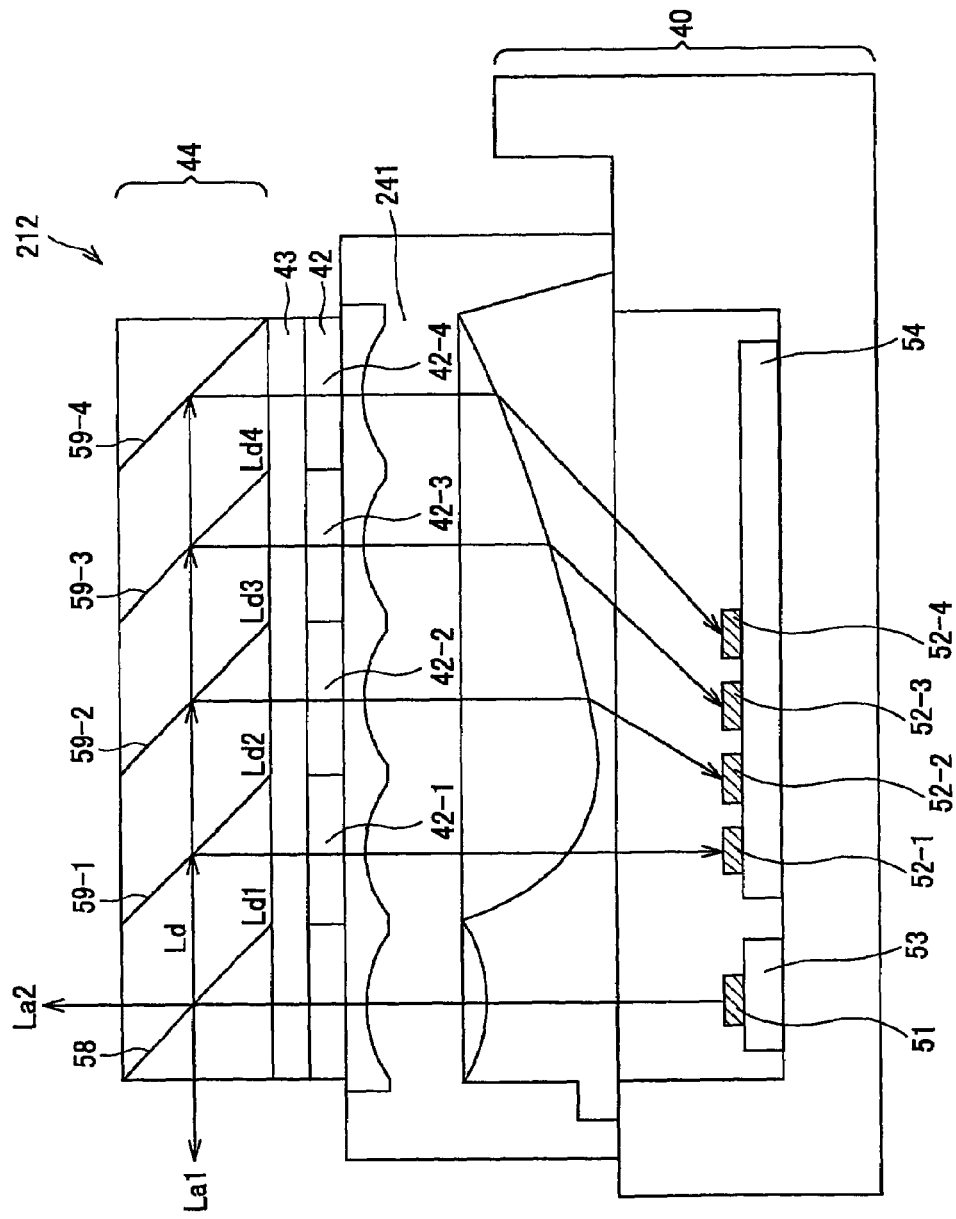
FIG. 24 is another structural view of the light-receiving/emitting composite unit.

When a short distance is set between the light source 51 and the light-receiving elements 52, the shape of the lens unit 241 is made convex near the light source 51, as shown in FIG. 24.

That is, the lens unit 241 can decide the image forming point of light on the basis of the arrangement of the light source 51 and the light-receiving elements 52. Also in circuit design, it is possible to provide a degree of freedom in the arrangement of the light source 51 and the light-receiving elements. Moreover, by providing the lens unit 241 as an optional unit, it is possible to flexibly deal with various IC specifications.

The lens unit 241 is not limited to the above-described form. For example, the lens unit 241 may be integrated with a composite prism.

The composite prism controlling the optical path by refracting the incident light La and the coherent light beams Ld1, Ld2, Ld3 and Ld4. The composite prism in combination with the lens unit 241 realizes the above-described effect. For example, the composite prism may be integrally molded with the lens unit 241 as a molded component.

It should be understood by those ordinarily skilled in the art that the invention is not limited to the embodiments illustrated in the accompanying drawings but various modifications, alternative constructions or equivalents can be implemented without departing from the scope and spirit of the present invention as set forth and defined by the appended claims.

As described above in detail, according to the present invention, the phase plate is stacked in such a manner that it is inserted between the polarizing units and the light splitting unit. The phase plate can convert linearly polarized light to circularly polarized light and cast the circularly polarized light on the polarizing light splitting unit. This enables free selection of a polarized component of light, without arranging the light source so that the polarized component of the light radiated from the light source is at about 45 degrees with respect to the polarizing light splitting unit as in the conventional technique. Accordingly, the problem that an excessive space is necessary for arrangement of components in the light-receiving/emitting unit 12 can be solved and a more compact structure can be employed. The phase plate can also receive combined light radiated from the light splitting films and radiate the combined light to the above-described polarizing units. Therefore, it suffices that the directions of polarization of the respective polarizing units are at an interval of 45 degrees from each other, and the restraint at the time of mounting the polarizing units can be reduced. Moreover, it is possible to simplify the manufacturing process and reduce the manufacturing cost. Moreover, since the single phase plate performs both conversion of light from the light source and conversion of light from the light splitting films, dimensional control becomes easier and further reduction in manufacturing cost can be realized.

Moreover, according to the present invention, as the members are packaged to form the integrated structure, precise position adjustment becomes easier and a large arrangement space for the components is not necessary. Therefore, reduction in size and weight of the whole displacement detection device can be realized. As the members are housed in the same housing member, the influence of environmental changes and changes with the lapse of time can be reduced, and deviation and the like at the time of adjustment can be restrained to the minimum level. Thus, the reliability of the whole device can be improved.

According to the present invention, since an arbitrary beam diameter can be set for the beam cast on the lattice plane, the influence of dust and scratches can be reduced. As the composite lens unit for controlling both the beam diameter of light radiated to outside and the beam diameter of received light is arranged within the same package, the degree of integration can be increased and the preparation process can be simplified. Therefore, the reliability of the whole device can be improved.

Moreover, according to the present invention, since a special light source with a limited coherence length need not be used, a typical inexpensive semiconductor laser can be used and significant reduction in cost can be realized. With such a simple structure, a large mounting tolerance can be taken for the diffraction grating, the light-receiving/emitting unit and the like.

Furthermore, according to the present invention, the lens unit for leading light La radiated from the light source and light radiated from the light splitting unit to predetermined image forming points is provided. The displacement detection device and the light-receiving/emitting composite which have this lens unit can decide the image forming point of light on the basis of the arrangement of the light source and the light-receiving elements. Also in circuit design, it is possible to provide a degree of freedom in the arrangement of the light source and the light-receiving elements. Moreover, by providing the lens unit as an optional unit, it is possible to flexibly deal with various IC specifications.

What is claimed is:

1. A displacement detection device for detecting displacement of an inspection target having a diffraction grating in the direction of a lattice vector, on the basis of an interference signal, the device comprising:

a light source for emitting light; a beam splitter for splitting the light emitted from the light source into two light beams and radiating the two light beams; a first lens provided between the light source and the beam splitter; reflection means for reflecting two first diffracted light beams obtained as the two light beams radiated from the beam splitter are diffracted by the diffraction grating; light splitting means for combining two second diffracted light beams obtained as the first diffracted light beams reflected by the reflection means are diffracted by the diffraction grating, to generate combined light, and then splitting the combined light into plural light beams; polarization means for transmitting only a predetermined polarized component of the split combined light; light-receiving means for photoelectrically converting coherent light transmitted through the polarization means and thus generating the interference signal; and a second lens provided between the polarization means and the light-receiving means.

2. The displacement detection device as claimed in claim 1, wherein the light source, the beam splitter, the first lens, the light splitting means, the polarization means, the light-receiving means, and the second lens are provided within the same package and constituted as independent units.

3. The displacement detection device as claimed in claim 1, further comprising a polarization element adapted for changing the polarized component so that the direction of polarization of the first diffracted light diffracted by the diffraction grating and the direction of polarization of the first diffracted light reflected by the reflection means become orthogonal to each other, and provided integrally with the reflection means.

4. The displacement detection device as claimed in claim 1, wherein the two light beams radiated from the beam splitter are converged at equal lengths from the light source, respectively.

5. The displacement detection device as claimed in claim 1, wherein the reflection means is arranged so that interference fringes of the two second diffracted light beams superposed by the light-receiving means are substantially null fringes or the interference signal is substantially at its maximum.

6. The displacement detection device as claimed in claim 1, wherein the light source and the reflection means are arranged at substantially conjugate positions in a geometrical-optical image forming relation, and the reflection means and the light-receiving means are arranged at substantially conjugate positions in a geometrical-optical image forming relation.

7. A displacement detection device for detecting displacement of an inspection target having a reflection-type diffraction grating in the direction of a lattice vector, on the basis of an interference signal, the device comprising:

a light source for emitting light; a polarizing beam splitter for splitting the light emitted from the light source into two light beams having difference polarized components and radiating the two light beams; a phase plate arranged between the light source and the polarizing beam splitter and adapted for changing the polarization state of the light emitted from the light source and leading the light to the polarizing beam splitter; image formation means for causing image formation of the two light beams radiated from the beam splitter onto a lattice plate of the diffraction grating; reflection means for reflecting two first diffracted light beams obtained as the two light beams radiated from the beam splitter are diffracted by the diffraction grating; light splitting means for combining two second diffracted light beams obtained as the first diffracted light beams reflected by the reflection means are diffracted by the diffraction grating, to generate combined light, and then splitting the combined light into plural light beams; polarization means for transmitting only a predetermined polarized component of the split combined light; and light-receiving means for photoelectrically converting coherent light transmitted through the polarization means and thus generating the interference signal.

8. A displacement detection device for detecting displacement of an inspection target having a diffraction grating in the direction of a lattice vector, on the basis of an interference signal, the device comprising:

a light source for emitting light; a polarizing beam splitter for splitting the light emitted from the light source into two light beams having difference polarized components and radiating the two light beams; reflection means for reflecting two first diffracted light beams obtained as the two light beams radiated from the beam splitter are diffracted by the diffraction grating; light splitting means for combining two second diffracted light beams obtained as the first diffracted light beams reflected by the reflection means are diffracted by the diffraction grating, to generate combined light, and then splitting the combined light into plural light beams; polarization means for transmitting only a predetermined polarized component of the split combined light; a lens unit for leading plural coherent light beams transmitted through the polarization means to predetermined positions, respectively; and light-receiving means for photoelectrically converting the plural coherent light beams led by the lens unit and thus generating the interference signal.

* * * * *

(12) EX PARTE REEXAMINATION CERTIFICATE (7118th)
United States Patent
Tamiya et al.

(10) Number: US 7,336,367 C1
(45) Certificate Issued: Oct. 20, 2009

(54) LIGHT-RECEIVING/EMITTING COMPOSITE UNIT, METHOD FOR MANUFACTURING THE SAME, AND DISPLACEMENT DETECTION DEVICE

(75) Inventors: Hideaki Tamiya, Kanagawa (JP); Kayoko Taniguchi, Kanagawa (JP); Akihiro Kuroda, Kanagawa (JP); Hidehiro Kume, Tokyo (JP)

(73) Assignee: Sony Precision Technology Inc., Shinagawa-Ku, Tokyo (JP)

Reexamination Request:
  No. 90/009,271, Sep. 11, 2008

Reexamination Certificate for:
  Patent No.: 7,336,367
  Issued: Feb. 26, 2008
  Appl. No.: 11/654,815
  Filed: Jan. 18, 2007

Related U.S. Application Data

(62) Division of application No. 10/414,860, filed on Apr. 15, 2003, now Pat. No. 7,187,449.

(30) Foreign Application Priority Data

Apr. 26, 2002 (JP) .................................... P2002-127525
Apr. 26, 2002 (JP) .................................... P2002-127526
Apr. 26, 2002 (JP) .................................... P2002-127527

(51) Int. Cl.
  *G01B 9/02* (2006.01)

(52) U.S. Cl. ........................................................ 356/494
(58) Field of Classification Search ........................ None
  See application file for complete search history.

(56) References Cited

FOREIGN PATENT DOCUMENTS

| JP | 61-066926 | 4/1986 |
|----|-----------|--------|
| JP | 01-233322 | 9/1989 |
| JP | 06-050743 | 2/1994 |
| JP | 08-241728 | 9/1996 |

*Primary Examiner*—Albert J Gagliardi

(57) ABSTRACT

A displacement detection device having excellent stability with the lapse of time and suitable for reduction in size and weight includes: a light source for emitting light; polarizing light splitting unit for splitting the light emitted from the light source into two light beams having difference polarized components, radiating the two light beams to an external optical system, and combining the two light beams reflected by the external optical system to generate combined light; a phase plate provided between the light source and the polarizing light splitting unit and adapted for changing the polarization state of the light emitted from the light source and leading the light to the polarizing light splitting unit; light splitting films for splitting the combined light generated by the polarizing light splitting unit into plural light beams; polarizing units for transmitting only a predetermined polarized components of the split combined light beams; and light-receiving elements for photoelectrically converting coherent light beams transmitted through the polarizing units and thus generating an interference signal.

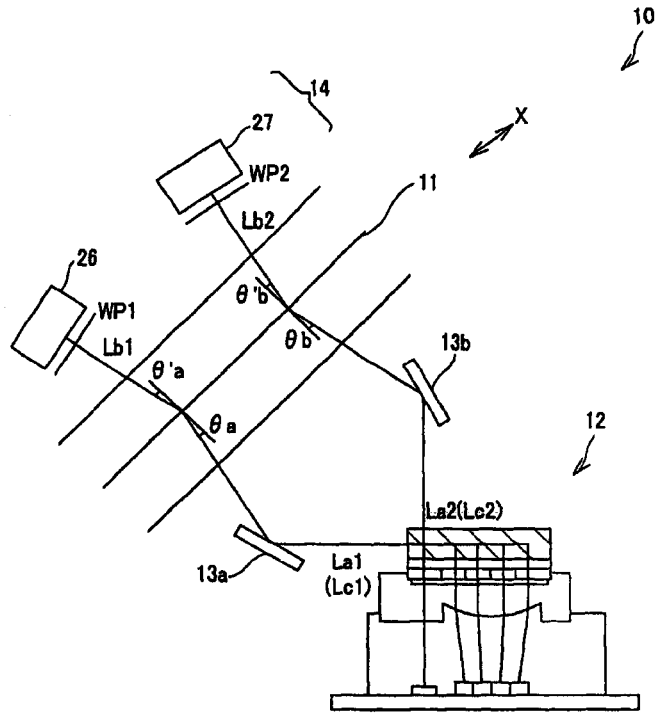

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *